US011247757B2

(12) United States Patent
Zheng et al.

(10) Patent No.: US 11,247,757 B2
(45) Date of Patent: Feb. 15, 2022

(54) MULTI-FUNCTIONAL AQUATIC VEHICLE AND SYSTEM THEREOF

(71) Applicant: POWERVISION TECH INC., Beijing (CN)

(72) Inventors: Weifeng Zheng, Beijing (CN); Yang Liu, Beijing (CN); Jie Tang, Beijing (CN); Zhong Cheng, Beijing (CN)

(73) Assignee: POWERVISION TECH INC., Beijing (CN)

( * ) Notice: Subject to any disclaimer, the term of this patent is extended or adjusted under 35 U.S.C. 154(b) by 0 days.

(21) Appl. No.: 16/911,413

(22) Filed: Jun. 25, 2020

(65) Prior Publication Data

US 2020/0346726 A1 Nov. 5, 2020

Related U.S. Application Data

(63) Continuation of application No. PCT/CN2018/123927, filed on Dec. 26, 2018.

(30) Foreign Application Priority Data

Dec. 27, 2017 (CN) .......................... 201711446860.8
Dec. 27, 2017 (CN) .......................... 201711446874.X (Continued)

(51) Int. Cl.
*B63C 11/52* (2006.01)
*A01K 99/00* (2006.01)
(Continued)

(52) U.S. Cl.
CPC .............. *B63C 11/52* (2013.01); *A01K 99/00* (2013.01); *B63B 21/58* (2013.01); *B63B 34/05* (2020.02);
(Continued)

(58) Field of Classification Search
CPC ......... B63C 11/00; B63C 11/52; A01K 99/00; A01K 79/02; A01K 97/02; B63B 21/00;
(Continued)

(56) References Cited

U.S. PATENT DOCUMENTS 6,269,763 B1\* 8/2001 Woodland ............... B63B 35/00
114/382
7,246,567 B2\* 7/2007 Shelton .................. B63G 8/001
114/312

FOREIGN PATENT DOCUMENTS

CN 1265364 A1 9/2000
CN 105923114 A1 9/2016
(Continued)

*Primary Examiner* — Lars A Olson
(74) *Attorney, Agent, or Firm* — Tianchen LLC.; Yuan R. Li; Yi Fan Yin

(57) ABSTRACT

A multi-functional aquatic vehicle comprises a main body. The main body comprises: a propulsion system, comprising at least one propeller for changing a motion attitude of the main body; a camera system, comprising at least one camera; a communication system, comprising a signal receiving module for receiving an external signal detected by the aquatic vehicle and a signal transmitting module for transmitting a signal to an external control system; and a control system, for controlling an operating state of the propulsion system, adjusting a capturing angle of the camera system and controlling internal and external communication of the communication system. A towing hook device comprises: a driving system, a connecting mechanism and a towing hook mechanism. The driving system drives the connecting mechanism to rotate such that the towing hook mechanism turns over or rotates to release a load.

19 Claims, 18 Drawing Sheets

(30) Foreign Application Priority Data

Feb. 28, 2018 (CN) .......................... 201810168384.6
Feb. 28, 2018 (CN) .......................... 201810168385.0

(51) Int. Cl.
  *B63B 21/58* (2006.01)
  *B63G 8/00* (2006.01)
  *B63G 8/16* (2006.01)
  *B63G 8/38* (2006.01)
  *B63G 8/39* (2006.01)
  *B63B 35/00* (2020.01)
  *B63B 34/00* (2020.01)
  *G01S 15/96* (2006.01)

(52) U.S. Cl.
  CPC .............. *B63B 35/00* (2013.01); *B63G 8/001* (2013.01); *B63G 8/16* (2013.01); *B63G 8/38* (2013.01); *B63G 8/39* (2013.01); *B63G 2008/005* (2013.01); *G01S 15/96* (2013.01)

(58) Field of Classification Search
  CPC ......... B63B 21/58; B63B 34/05; B63B 35/00; B63G 8/00; B63G 8/001; B63G 8/16; B63G 8/38; B63G 8/39; B63G 2008/005; G01S 15/96
  USPC ......................................................... 114/312
  See application file for complete search history.

(56) References Cited

FOREIGN PATENT DOCUMENTS

| | | |
|---|---|---|
| CN | 107340777 A1 | 11/2017 |
| JP | 2016202008 A1 | 12/2016 |
| KR | 101717218 B1 | 3/2017 |

* cited by examiner

MULTI-FUNCTIONAL AQUATIC VEHICLE AND SYSTEM THEREOF

CROSS-REFERENCE TO RELATED APPLICATIONS

This is a continuing application, under 35 U.S.C. § 120, of copending international application No. PCT/CN2018/123927, filed Dec. 26, 2018, which designated the United States; this application also claims the priority, under 35 U.S.C. § 119, of Chinese patent applications No. 201711446860.8 and No. 201711446874.X, filed Dec. 27, 2017 and No. 201810168384.6 and No. 201810168385.0, filed Feb. 28, 2018; the prior applications are herewith incorporated by reference in their entirety.

TECHNICAL FIELD

The present invention relates to an aquatic vehicle, and, more especially, to a multi-functional aquatic vehicle and a system thereof.

BACKGROUND

The existing commercially available aquatic vehicles commonly include remote control boats, bait boats and fish detectors, of which the remote control boats can only achieve basic navigation in water, the bait boats can only fulfill simple release of materials, and the fish detectors can only carry out uncomplicated identification of fish shoal by a sonar system. These aquatic vehicles perform a single function and show a low degree of intelligence such that they cannot achieve the automatic control, material distribution, fish detection and other operations in a complex underwater environment, let alone the real-time transmission of images and videos according to the underwater environment, or the observation, imaging and transmission at multiple angles in multiple degrees of freedom. To achieve enough intelligence, many difficulties in the prior art need to be overcome and concentrated research and development need to be conducted. Only by doing so can an ideal aquatic vehicle system be obtained.

SUMMARY

Therefore, the present invention provides a multi-functional aquatic vehicle to solve the technical problem about insufficiently intelligent application of the existing aquatic vehicles.

In order to meet the above purpose, a multi-functional aquatic vehicle provided herein comprises a main body, characterized in that the main body comprises: a propulsion system, comprising at least one propeller for changing a motion attitude of the main body; a camera system, comprising at least one camera; a communication system, comprising a signal receiving module for receiving an external signal detected by the unmanned boat and a signal transmitting module for transmitting a signal to an external control system; and a control system, for controlling an operating state of the propulsion system, adjusting a capturing angle of the camera system and controlling internal and external communication of the communication system.

According to one aspect of the present invention, the propulsion system further comprises a steering rudder, wherein the motion attitude of the main body may be changed by the propeller and/or the steering rudder.

According to one aspect of the present invention, the camera is capable of adjusting a capturing angle in multiple degrees of freedom, and the aquatic vehicle is an unmanned boat.

According to one aspect of the present invention, the camera system further comprises: a first connecting rod; a second connecting rod, connected with the first connecting rod through a first rotating shaft; and a second rotating shaft, connecting the camera and the second connecting rod.

According to one aspect of the present invention, both the first rotating shaft and the second rotating shaft can be driven electrically or manually.

According to one aspect of the present invention, the unmanned boat further comprises at least one mounted device that is: a towing hook device, arranged at the tail of the main body and used for dragging a load; and/or a bait device, mounted on the main body and used for delivering materials; and/or a fish detector, mounted on the main body and in wire or wireless communication with the main body through the communication system.

According to one aspect of the present invention, the bait device comprises a cavity, for holding the materials; and a rotating mechanism, in fixed connection with the cavity, the rotating mechanism rotating to drive the cavity to turn over to release the materials.

According to one aspect of the present invention, the fish detector is screwed under the main body.

According to one aspect of the present invention, the fish detector comprises a sonar device, for detecting underwater targets.

According to one aspect of the present invention, the camera system is a camera system with a switchable angle of view, capable of switching a capturing angle and capturing a target at different angles of view.

The present invention also provides a multi-functional aquatic vehicle system comprising the aquatic vehicle as described above, a remote control, achieving wire or wireless control to the aquatic vehicle, and/or a terminal electronic device, wherein monitoring, control, track setting, and video or picture browsing of a state of the aquatic vehicle are achieved through the visual control interface.

The present invention also provides a towing hook device comprising: a driving system, for providing a driving force for rotation; a connecting mechanism, connected to the driving system and rotating according to the driving force; and a towing hook mechanism, for hooking a carrier; wherein the driving system drives the connecting mechanism to rotate such that the towing hook mechanism turns over or rotates to release the carrier According to one aspect of the present invention, the towing hook mechanism comprises a snapping part, located below the connecting mechanism and used for snapping the carrier, wherein the driving system drives the connecting mechanism to rotate and enables the snapping part to turn over to release the carrier.

According to one aspect of the present invention, the driving system comprises: a steering engine bracket, fixed at the tail of the hull to provide support; and a steering engine, fixed on the steering engine bracket; and the connecting mechanism comprises: a steering engine adapter, connecting an output shaft of the steering engine and a connecting shaft; and an adapting shaft, fixed on the connecting shaft.

According to one aspect of the present invention, the snapping part comprises a torsional spring, the snapping part turning over within a certain angle range under the action of the torsional spring; and the adapting shaft comprises a built-in spring pull pin, abutting at the lower end thereof against the top end of the snapping part for limiting a position of the snapping part at the time of snapping the load.

According to one aspect of the present invention, the spring pull pin comprises: a pull pin handle; a pull pin big-diameter portion, located below the pull pin handle; a pull pin small-diameter portion, abutting against at the top end of the snapping part when the spring pull pin is lowered; and a pull pin spring, placed between the pull pin handle and the pull pin big-diameter portion.

According to one aspect of the present invention, a process that the towing hook device releases the carrier comprises: the driving system drives the connecting mechanism to rotate, and the spring pull pin disengages from a limiting position with regard to the snapping part as the connecting mechanism rotates, such that the snapping part turns over under the action of the torsional spring to release the load.

According to one aspect of the present invention, the towing hook mechanism comprises a wire installation part, for installing a connecting wire connecting to the carrier, the wire installation part comprising a snapping piece located below the connecting mechanism; wherein the driving system drives the connecting mechanism to rotate such that the snapping piece turns over and drives the wire installation part to rotate to release the carrier.

According to one aspect of the present invention, the connecting mechanism comprises: a steering engine adapter, connecting the output shaft of the steering engine and the connecting shaft; and an adapting shaft, fixed on the connecting shaft; and the connecting mechanism also comprises: at least one supporting shaft sleeve, providing a radial support for rotation of the connecting shaft.

According to one aspect of the present invention, the connecting mechanism comprises: an elastic collar, located on the connecting shaft and on one side of the supporting shaft sleeve close to the steering engine adapter to achieve positioning of the connecting shaft in an axial direction.

According to one aspect of the present invention, the snapping piece comprises a torsional spring, wherein the snapping piece turns over within a certain angle range under the action of the torsional spring, and the wire installation part comprises a U-shaped wire installation space, capable of turning over as the snapping piece turns over, and further comprises a rotating shaft, about which the wire installation part turns over.

The present invention also provides an aquatic vehicle, characterized in that it comprises a main body and the towing hook device as described above.

In summary, a multi-functional aquatic vehicle and a system thereof according to the present invention include highly integrated camera, bait placing device, fish detector, towing hook device and other devices, and are equipped with a corresponding controlling & operating system and intelligent hardware connection to improve the intelligent multi-functional application of the aquatic vehicle. Use of a long-distance communication module, a camera with multiple degrees of freedom, a wireless remote control and an intelligent fish detector can meet a variety of existing needs underwater, and can transmit an underwater image or video in real time. By a visualization system on shore can the visual control and display be carried out to make it more convenient to obtain the rich topographical information underwater. The whole system is straightforward, convenient to apply, and has complete functions and a great prospect for intelligent application. The foregoing and other technical contents, features and effects in association with the present invention will be clearly presented in the following detailed description of the embodiments with reference to the drawings.

DETAILED DESCRIPTION

Figure 1:
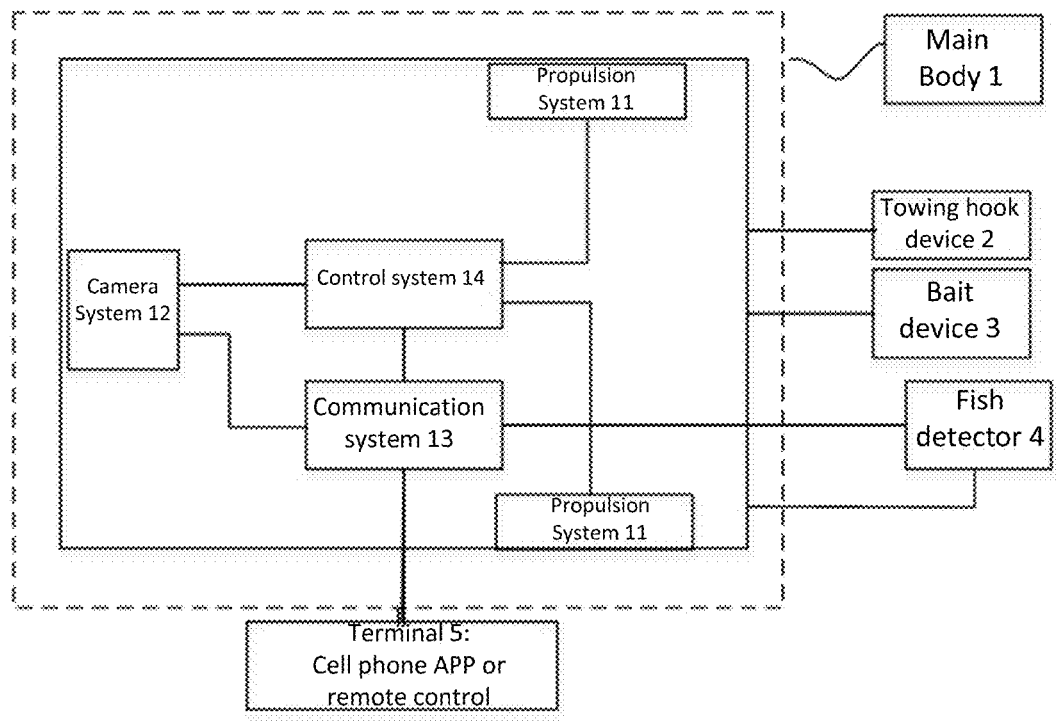
FIG. 1 is a structural diagram of a multi-functional aquatic vehicle system according to one embodiment of the present invention.

To demonstrate the purposes, technical solutions and advantages of the present invention in a much clearer manner, the present invention will be further described in detail below with reference to the drawings. Obviously, the examples described herein are not all of the examples according to the present invention, but some of them only. Based on the examples described herein, all other examples obtained by those skilled in the art without creative labor should fall within the scope of protection recorded in the present invention.

The terms in the examples of the present application are used for the purpose of describing specific examples only, instead of aiming to limit the present application. Terms in the singular such as "one/a/an", "the" and "this" used in the examples of the present application and the appended claims also aim to include the plural forms thereof, unless other meaning is explicitly indicated in the context; and the term "multiple" generally means at least two included.

It should be understood that the terms "and/or" used herein only describe some association relation between objects in association, indicating that three kinds of relation may exist therebetween; for example, "A and/or B" may indicate three circumstances including: A existing alone, A and B existing concurrently, and B existing alone. In addition, the symbol "/" herein generally indicates that the relation between objects in association in front and back of the symbol can be expressed by the term "or".

It should be understood that although such terms as first, second, third, etc. may be used to describe things in the examples of the present application, these things shall not be limited to such terms. Such terms are only used to distinguish these things. For example, without departing from the scope of the examples of the present application, a first thing may also be referred to as a second thing, and similarly, the second thing may also be referred to as the first thing.

Depending on the context, the words "if" and variants thereof used herein can be interpreted as "when" or "at the time of" or "in response to determination" or "in response to detection". Similarly, depending on the context, the phrase "if determined" or "if detected (conditions or events stated)" can be interpreted as "when determined" or "in response to determination" or "when detected (conditions or events stated)" or "in response to detection (conditions or events stated)".

It should also be noted that the term "comprise", "include" or any other variations thereof are intended to cover non-exclusive inclusion, such that a commodity or system including a series of elements includes not only those elements, but also others that are not explicitly listed out, or further includes elements deemed inherent in such a commodity or system. Without further restrictions, if an element is defined in such a statement as "comprise a . . . ", this does not mean exclusion of other identical elements that further exist in the commodity or system comprising the element.

The detailed description of the preferred examples of the present invention will be made below with reference to FIGS. 1-4.

As shown in FIG. 1, it is a structural diagram of a multi-functional aquatic vehicle system according to one example of the present invention. Apart from a terminal part (i.e. apart from an APP and remote control far away from the main body), the rest can be considered as a multi-functional aquatic vehicle. The multi-functional aquatic vehicle comprises: a main body 1 further comprising a propulsion system 11, a camera system 12, a communication system 13 and a control system 14, all of which belong to the body part of the main body 1; among them, the propulsion system 11 comprises at least one propeller 111, for changing a motion attitude of the main body 1; the camera system 12 comprises at least one camera 121, capable of adjusting a capturing angle in multiple degrees of freedom; the communication system 13 comprises a signal receiving module, for receiving an external signal detected by the aquatic vehicle and a signal transmitting module for transmitting a signal to an external control system; and the control system 14 is used for controlling an operating state of the propulsion system 11, adjusting the capturing angle of the camera system 12 and controlling internal and external communication of the communication system 13. According to one example of the present invention, the aquatic vehicle can be a multi-functional unmanned boat.

The main body (hull) 1 shown in this part forms a main body 1 with basic functions by installing inside the same such avionics control systems as the propulsion system 11, the camera system 12, the communication system 13 and the control system 14. The propulsion system 11 preferably comprises at least one propeller 111. Then, when a single propeller is used in the embodiment, the mode of propelling at the tail or the mode of propelling directly below the main body 1 can be adopted to ensure that the aquatic vehicle can freely navigate. Generally, the propeller comprises an engine controlled by the control system 14 and a screw propeller that can be installed in a forward or reverse way. The camera system 12 comprises a camera structure with a waterproof design, which achieves angle adjustment and shooting by means of the control from the control system 14. The communication system 13 generally comprises a signal receiving module, for receiving an external signal detected by the aquatic vehicle, and a signal transmitting module for transmitting a signal to an external control system. On the one hand, the signal receiving module is used for receiving a signal returned from a detector (such as a depth detector, a temperature detector, etc.) of the aquatic vehicle; on the other hand, it is used for receiving a control signal transmitted from an external remote control. And the signal transmitting module is mainly used for transmitting to an onshore console an image/video signal and a signal of the state information of the aquatic vehicle. The signal transmitting or receiving module preferably includes a sonar module. The sonar module has certain advantages in transmission in water. The control system 14 is used for overall control of all operating instructions for the propulsion system 11, the camera system 12 and the communication system 13.

In one embodiment, the control system 14 may comprise a central processing element, including a microprocessor, a single core processor, a multi-core processor, a microcontroller, a logic device (e.g., a programmable logic device configured to perform processing functions), a data signal processing device, or some other types of publicly known processors. The central processing element is adapted to interactive communication with the propulsion system 11, the camera system 12 and the communication system 13.

Figure 2:
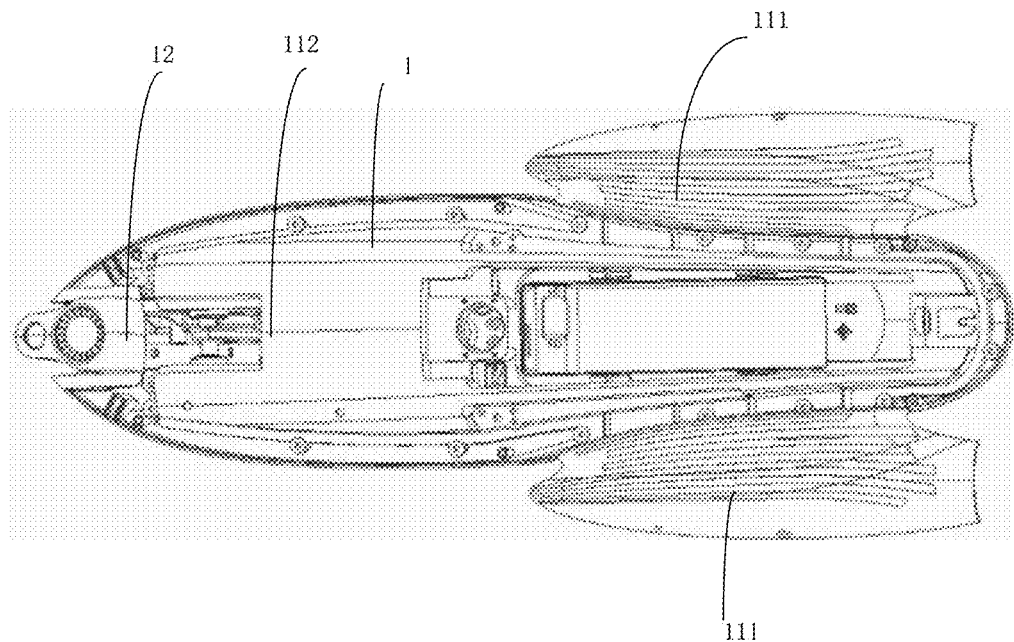
FIG. 2 is a structural diagram of a propeller system of the multi-functional aquatic vehicle system according to one embodiment of the present invention.

Specifically, as shown in FIG. 2, the propulsion system 11 described in the present invention may comprise two or more propellers 111, preferably 2 to 7. By arranging multiple propellers 111 in different positions of the main body 1 and in different orientations, further in combination with the flexible control by the control system 14, can adjustment to multiple attitudes of the main body be achieved; and the motion attitudes include, for example, advance, retreat, left-turn, right-turn, rotation, head-shaking, nodding, etc. Surely, in the preferred embodiments, it can further comprise a steering rudder, and then adjustment to an attitude of the main body 1 can be made by the steering rudder arranged in the main body 1. Surely, the steering rudder can be controlled in cooperation with the propeller 111 to adjust the attitude. For example, when two propellers 111 are used in operation, the two propellers are symmetrically arranged on both sides of the main body 1, as shown in FIG. 2. By then, power of the two propellers is controlled to make the power of one larger and that of the other smaller and enable the steering rudder to be pulled to one side having the smaller power, such that the function of left-turn can be fulfilled. Similarly, according to the driving knowledge, the main body can be adjusted to advance, retreat, turn left, turn right, rotate, shake the head, nod or the like in combination with the arrangement position and the number of the propellers and the direction of the steering rudder.

In the embodiment of the present invention, the propeller 111 may be a propeller combining a motor with a screw propeller, or may be a water-jetting propeller. Among them, it is preferred to use a propeller combining a motor with a screw propeller, usually a motor driving a screw propeller. Certainly, the forward and reverse rotation of the motor can match the forward and reverse rotation of the propellers for propulsion.

Figure 3:
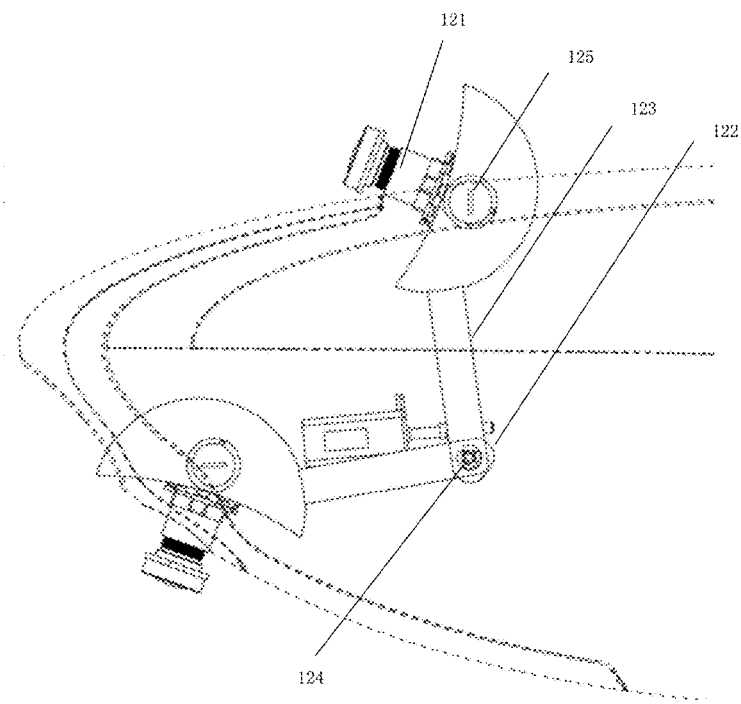
FIG. 3 is a structural diagram of a camera system of the multi-functional aquatic vehicle system according to one embodiment of the present invention.

As shown in FIG. 3, in one of the embodiments of the present invention, the camera system 12 further comprises: a first connecting rod 122; a second connecting rod 123, connected with the first connecting rod 122 through a first rotating shaft 124; and a second rotating shaft 125, connecting the camera 121 and the second connecting rod 123. Both the first rotating shaft 124 and the second rotating shaft 125 can be driven electrically or manually. The rotation of the aforesaid dual rotating shafts can meet the requirements for shooting at overwater and underwater angles of view, wherein the first rotating shaft 124 (elbow joint) is preferably electrically driven, and the second rotating shaft 125 (wrist joint) is preferably manually driven. The camera supports such two configurations as a 4K camera and FHD camera. The camera has a headlight capable of providing certain illumination for camera shooting. The headlight may be at least one LED light arranged in parallel with, and rotating along with, the camera. The brightness of the LED light can be adjusted to adapt to varying needs for illumination. At the same time, when shooting is not necessary, the brightness can be adjusted to the darkest level or just turned off. The camera can rotate about the second rotating shaft by 360 degrees to adapt to the needs for shooting at any angle. A user can overturn the preview and recording interfaces of the camera with one button on the APP to ensure that the images can be previewed and recorded in a normal orientation after the camera mechanism rotates at an angle of more than 90°.

Preferably, the headlight comprises a light control module, and a fish luring light and an illumination light, connected with the light control module, respectively. The light control module is used for controlling and adjusting a light source. At the same time, the light control module is in electrical connection with a central control unit to receive light control instructions issued by the central control unit. The fish luring light comprises a waterproof circuit board and a plurality of LED light-emitting lights arranged on the circuit board, wherein the LED light-emitting lights can emit visible and invisible light, of which the visible light at least comprises red light, green light and blue light, wherein the LED light-emitting lights can emit flashing light to attract the attention of fish, while the invisible light at least comprises infrared light. The invisible light is arranged due to the fact that fish have different perception of light from human eyes, and fish can perceive infrared light. Further, the light control module can control the brightness and color of the LED illumination light according to the detection results of the sonar device. For example, when a target fish school is found being far away, the light control module can control the fish luring light to emit light with strong penetration to lure fish, and also can enhance the brightness of the light.

Figure 4:
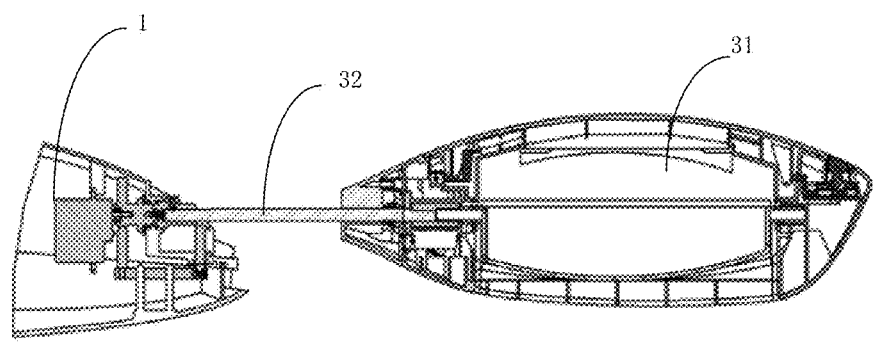
FIG. 4 is a structural diagram of a bait device of the multi-functional aquatic vehicle system according to one embodiment of the present invention.

As shown in FIGS. 1 and 4, the aquatic vehicle may further comprise: a towing hook device 2 arranged at the tail of the main body 1 and used for dragging a load, for example, used to drag and hang fish wire and hook, rescue materials, etc. After a user delivers the materials to a designated position, the towing hook device will be released and the transported materials will automatically fall off from the main body. No particular limitation is made of the number of the towing hook devices 2, and 1 to 3 towing hook devices can be arranged according to the specific structure of the aquatic vehicle, or suitably, in a number sufficient to drag the load. The towing hook device is usually arranged on the main body 1 by welding or integral-forming process, preferably arranged on the inner side of the tail of the main body 1 in a more concealed manner.

Preferably, as shown in FIG. 4, the aquatic vehicle may further comprise: a bait (placing) device 3, mounted on the main body 1 and used for delivering materials. A cavity 31 is arranged in the bait device, such that materials (bait, etc.) to be transported can be loaded in the cavity 31, and materials in the cavity, after being transported to a designated position by the main body, are released to the water surface by means of rotation of the driving mechanism. The bait device 3 and the towing hook device 2 can be driven by a shared driving mechanism or driven separately. The cavity 31 of the bait device can turn over following rotation of the driving shaft 32 to fulfill the release function.

The aquatic vehicle may further comprise: a fish detector 4, mounted on the main body 1 in wire or wireless communication with the main body 1 through the communication system 13. When the fish detector 4 finds a fish school target, it can transmit a video or image signal to the main body 1. Upon analysis and denoising, the main body 1 can transmit the clear situation of the fish school to the onshore console. The fish detector 4 can be arranged in such a way as to separate from the main body 1, and communication between both can be achieved by wireless communication, or the fish detector 4 also can be arranged at the front end of the aquatic vehicle to detect fish school targets around the front end.

Preferably, the fish detector 4 comprises an underwater imaging system, for capturing a dynamic image of a school of fish, which can be achieved by adopting an infrared imaging device (such as an infrared camera). The imaging system may represent an infrared camera of any type. For example, this infrared camera detects infrared radiation and provides representative data (e.g., one or more snapshot or video infrared image). For example, the imaging system may represent an infrared camera pointing to a near, intermediate, or far infrared spectrum. In other examples, the imaging system may comprise a radar imaging device and/or a sonar imaging device for capturing an image, and a control element and a display element arranged on the remote control can be used to communicate with the fish detector. In an alternative embodiment, the imaging system may represent an imaging device of other or different components using electromagnetics and/or acoustic spectrum.

Preferably, the fish detector of the present invention comprises a housing, in which provided are a sonar detection module for detecting the underwater environment and the position of a school of fish; an image capture module for recording or shooting an underwater image; a fish luring device for luring fish to approach the fish detector, comprising a fish luring light; and a central processing module. The sonar detection module, the image capture module and the fish luring device are electrically connected with the central processing module, respectively. This meets the various needs for fish searching, fish detecting and observation of fishing progress. At the same time, the practicability and enjoyment of the entire aquatic vehicle system can be enhanced in combination with the fish luring device and devices of fish catching.

In an alternative embodiment, the present invention also provides a multi-functional aquatic vehicle system, comprising any one of the aquatic vehicles mentioned above and a remote control, through which the wire or wireless control of the aquatic vehicle is achieved; a visual control interface, through which monitoring, control, track setting, and video or picture browsing of a state of the aquatic vehicle are achieved. The aquatic vehicle performs at least one movement of autonomous cruise, automatic return and automatic obstacle avoidance.

According to one of the embodiments of the present invention, the remote control may be an underwater or overwater remote control, which can adopt a wire or wireless communication mode to enable the control and communication with the aquatic vehicle. In general, wireless remote control can be used, and this is not limited by the underwater environment. Sonar is used to transmit wireless signals, which can perform accurate communication with the matched aquatic vehicle. Usually, the underwater remote control needs to pass the waterproof test, especially the test of adaptability to such environment as sea water. Only by doing so can the normal use of underwater communication be ensured. Preferably, the remote control can be equipped with a display screen. Through timely visual operation, it then can perform accurate control according to the situation of a target detected in the underwater environment in a timely manner, thereby facilitating the rapid response of the aquatic vehicle. Surely, wired control also can be used within a certain range, such that a large number of video signals can be transmitted to the remote-control device in time.

The visual control interface is an APP or a console computer system, preferably realized by a cell phone APP. On the cell phone APP, parameters of the monitoring, display and operating states of the aquatic vehicle can be set and sent to the remote control, and then the remote control sends a control command to the aquatic vehicle system. On the other hand, the aquatic vehicle transmits a video or image signal underwater to the wireless remote control in a wired or wireless way, and the signal is further transmitted by the wireless remote control to the cell phone APP, and displayed on the APP. According to the visual state, a controller subsequently sends a control command, such as real-time fish-catching or shooting or tracking, to the aquatic vehicle.

In summary, a multi-functional aquatic vehicle and a system thereof according to the present invention include highly integrated camera, bait device, fish detector, towing hook device and other devices, and are equipped with a corresponding controlling & operating system and intelligent hardware connection to improve the intelligent multi-functional application of the unmanned boat. Use of a long-distance communication module, a camera with multiple degrees of freedom, a wireless remote control and an intelligent fish detector can meet a variety of existing needs underwater, and can transmit an underwater image or video in real time. By a visualization system on shore can the visual control and display be carried out to make it more convenient to obtain the rich topographical information underwater. The whole system is straightforward, convenient to apply, and has complete functions and a great prospect for intelligent application. The foregoing and other technical contents, features and effects in association with the present invention will be clearly presented in the following detailed description of the embodiments with reference to the drawings.

FIGS. 5-16 show a surface-navigating robot or a multi-functional aquatic vehicle according to the present invention. The detailed description of the preferred embodiments of the present invention will be made below with reference to the drawings.

Embodiment 1

Figure 5:
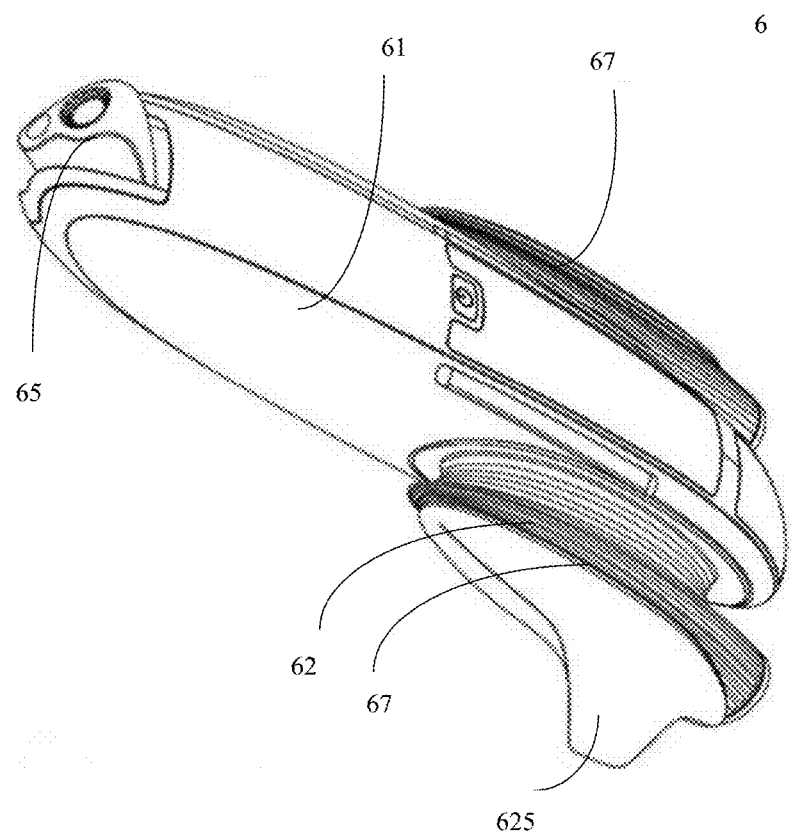
FIG. 5 is a structural diagram of a surface-navigating robot according to one embodiment of the present invention.
Figure 6:
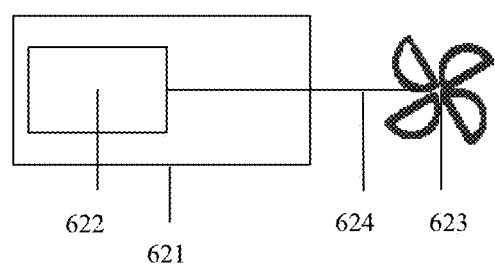
FIG. 6 is a structural diagram of a propeller of the surface-navigating robot according to one embodiment of the present invention.

As shown in FIG. 5-6, this embodiment provides a surface-navigating robot or multi-functional aquatic vehicle 6, comprising: a robot main body 61; at least one propeller 62, comprising a propulsion cabin 621, integrally formed with the robot main body 61; a propulsion motor 622, located in the propulsion cabin 621; a screw propeller 623, connected with the propulsion motor 622 by a driving shaft 624; an anti-swing arm 625, laterally extending outward along the propulsion cabin 621; and a camera system 65 with a switchable angle of view, arranged at the front end of the robot main body 61 and capable of capturing targets within a range of 360 degrees above or below the robot main body 61.

Figure 7:
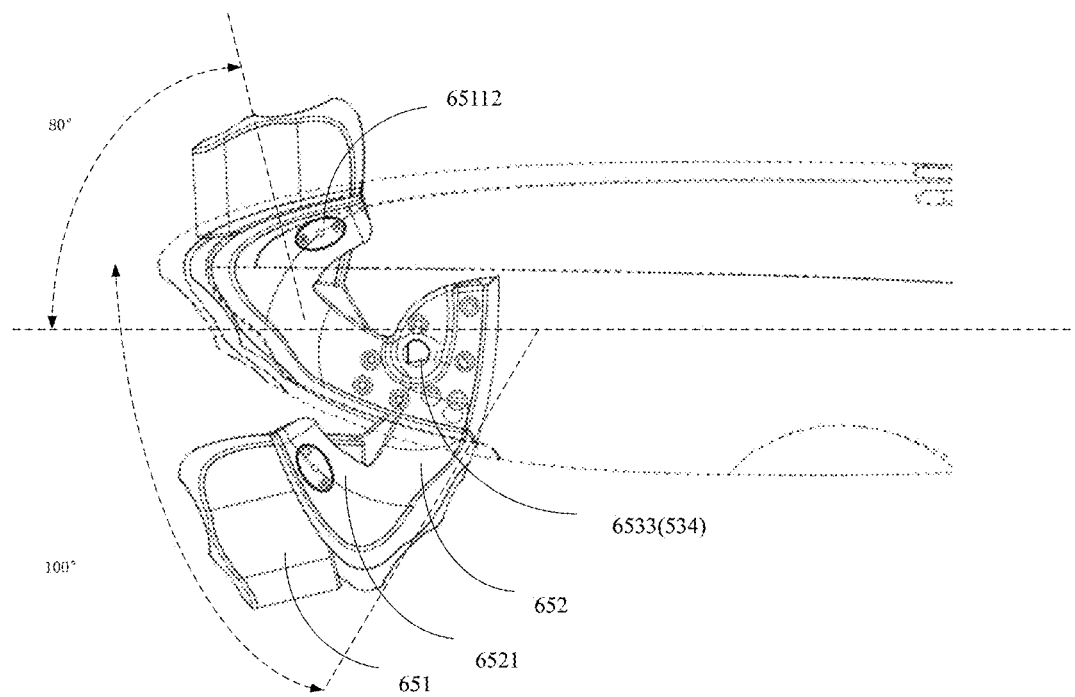
FIG. 7 is a structural diagram of a rotated camera device of the surface-navigating robot according to one embodiment of the present invention.
Figure 8:
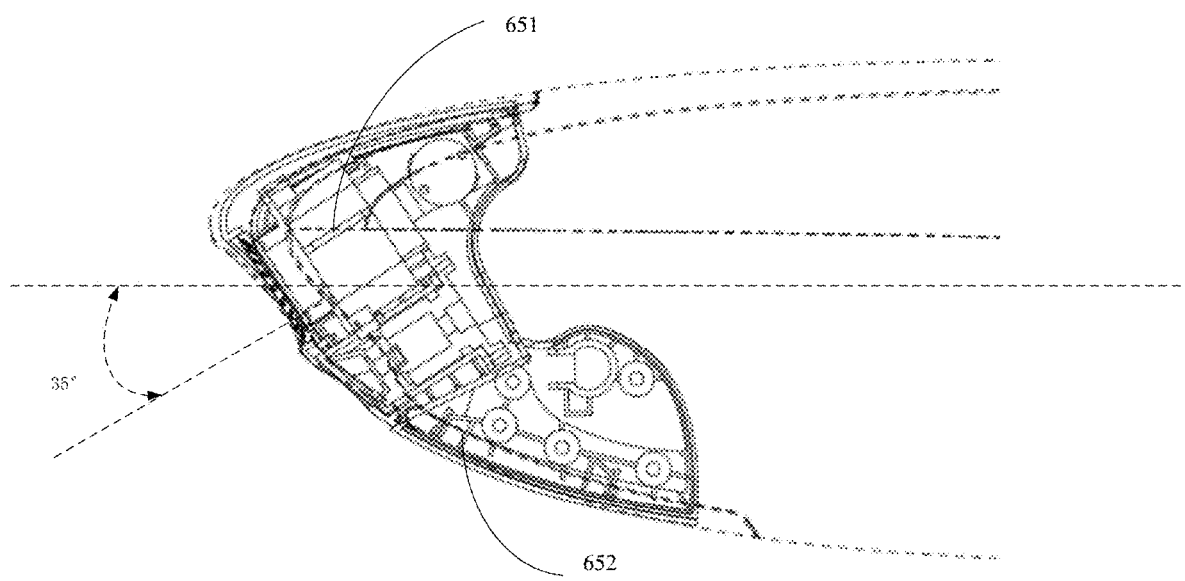
FIG. 8 is a schematic of the original position of the camera device of the surface-navigating robot according to one example of the present invention.

As can be understood with reference to FIGS. 7-8, a preferred structure of the camera system 65 with the switchable angle of view includes: a camera device 651, capable of rotating within a range of 0-115 degrees and hovering at any angle within the range; a rotating arm 652, rotatably connected with the camera device 651 to enable the camera device 651 to rotate within a range of 0-100 degrees and hover at any angle within the range; a driving mechanism 653, rotatably connected with the rotating arm 652 to drive the rotating arm 652 to rotate within a range of 0-100 degrees.

Figure 9:
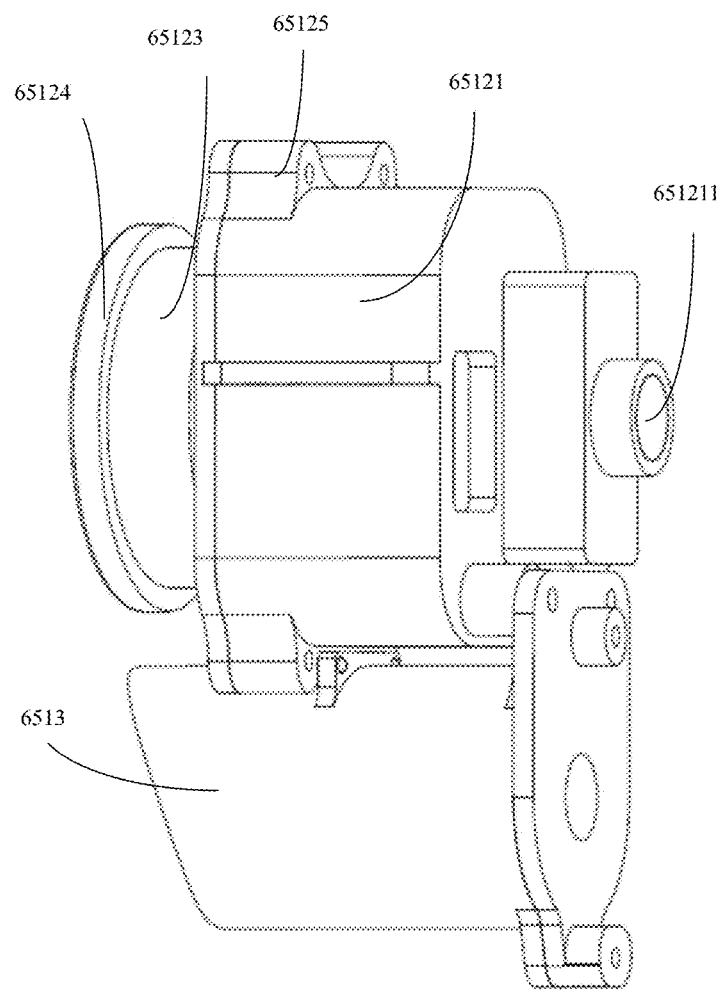
FIG. 9 is a structural diagram of a camera module according to one embodiment of the present invention.
Figure 10:
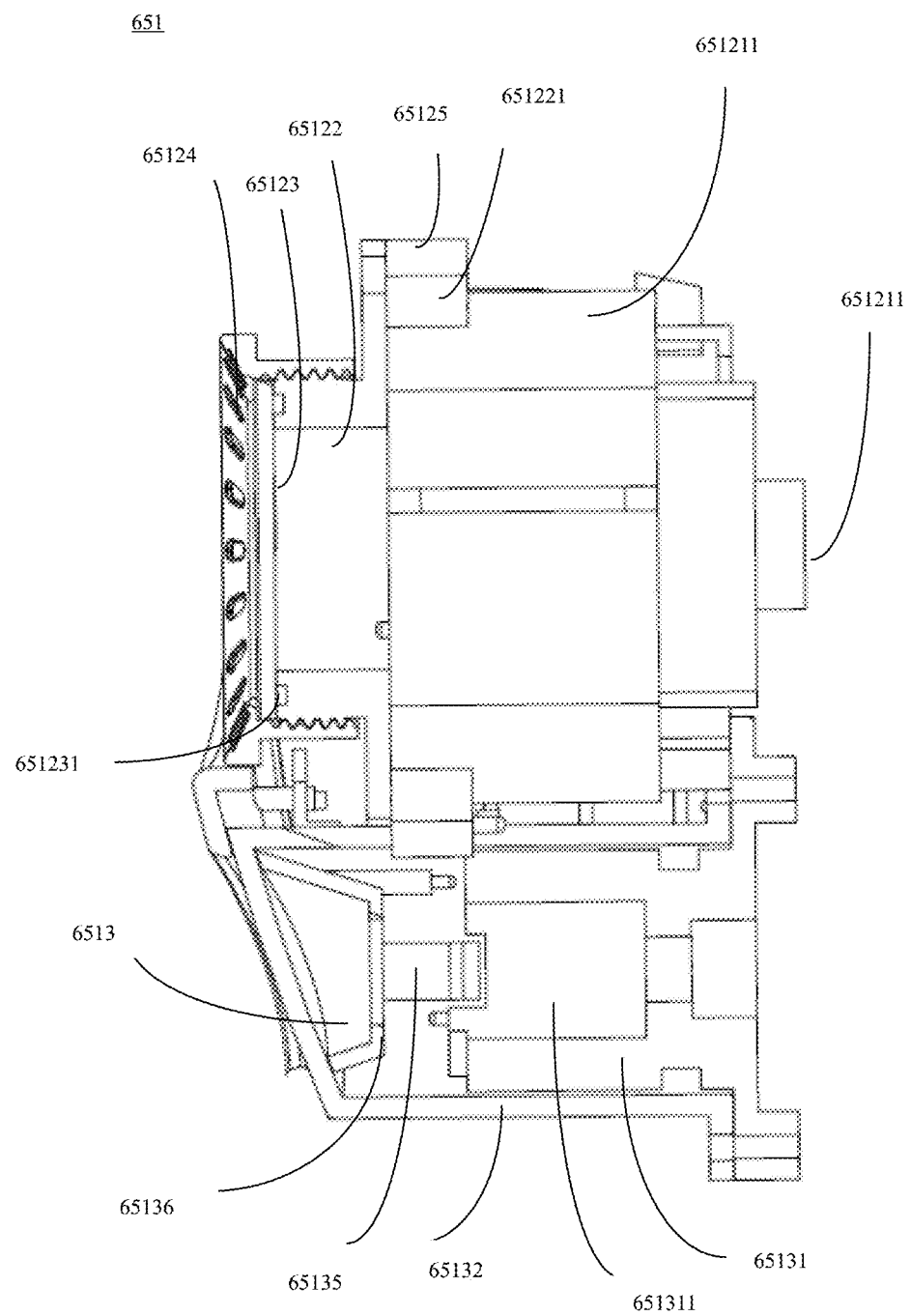
FIG. 10 is a sectional view of the camera module according to one embodiment of the present invention.

With reference to FIGS. 9-10 in particular, the camera device 651 comprises: a camera device housing 6511, preferably integrally formed; a camera device module 6512, held in the camera device housing 6511, and, specifically, comprising: a rear cabin 65121, preferably in a square or circular structure, the rear cabin 65121, having in the back a holding cavity for internally holding a processor, a controller and other electronic components, and a wire hole 651211, through which the internal communication wire of the camera device passes; a CCD imaging module, placed in the built-in space of the rear cabin 65121 and connected with the processor, etc. The camera device module 6512 further comprises a front cabin 65122, preferably in a convex structure, wherein the front cabin 65122 is sealed and docked with the rear cabin 65121 through a first sealing rubber ring 651221 that is held in a groove between the front cabin 65122 and the rear cabin 65121; and further comprises a lens module 65123, adhered to the front end of the front cabin 65122 through a second sealing rubber ring 651231, in particular to the protruding position of the front cabin 65122; and further comprises a circular hatch cover 65124, having an internal thread, while there is an external thread outside the protruding part of the front cabin 65122, such that the hatch cover 65124 is threaded to the front end of the front cabin 65122, and tightly pressed against the edge of the lens module 65123.

Preferably, the camera device module 6512 further comprises: lugs 65125, arranged on the outer edge of the rear cabin 65121, preferably with two lugs arranged on the upper part of the rear cabin 65121 and two lugs arranged on the lower part of the rear cabin 65121 respectively. The camera device module 6512 is fixed to the camera device housing 6511 by the lugs 65125.

Figure 12:
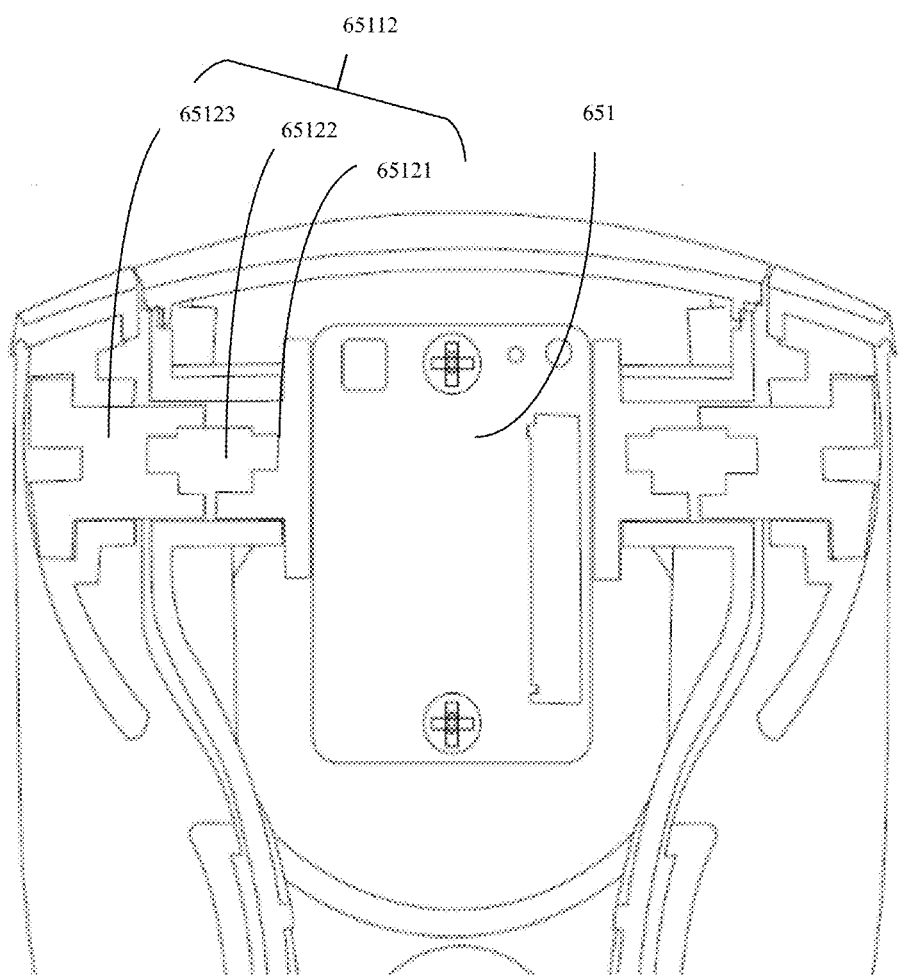
FIG. 12 is a sectional view of the autorotation structure of the camera device according to one embodiment of the present invention.

As shown in FIG. 12, preferably, the camera device 61 has a shaft hole 65111 throughout the camera device housing 6511, the shaft hole 65111 laterally penetrating the upper rear end of the camera device housing 6511, it is rotatably connected to the rotating arm 652 through the shaft hole 65111 and the connecting device 65112. Preferably, the connecting device 65112 comprises: a convex shaft sleeve 65121, having a protruding end extending into the inner side of the shaft hole 65111; and a damping shaft 65122, arranged in the shaft hole 65111 and connected with the convex shaft sleeve 65121, which can slow down the rotatory velocity and stop at any position, and, specifically, can be formed with damping oil or the inner structure of a spring; and a bolt 65123, screwed into the shaft hole from the outer side of the shaft hole and connected to the damping shaft 65122. By means of the connecting device 65112, the camera device body can rotate itself, and hover at any position in a route. The rotation angle of the entire camera device body ranges between 0 and 135 degrees, that is to say, it can rotate from a position downward from the initial horizontal plane by 30 degrees to a position upward from the horizontal plane by 80 degrees. And it can hover at any angle as needed, such as at a horizontal position of 0 degree, a position by 45 degrees oblique upward therefrom, etc.

Figure 11:
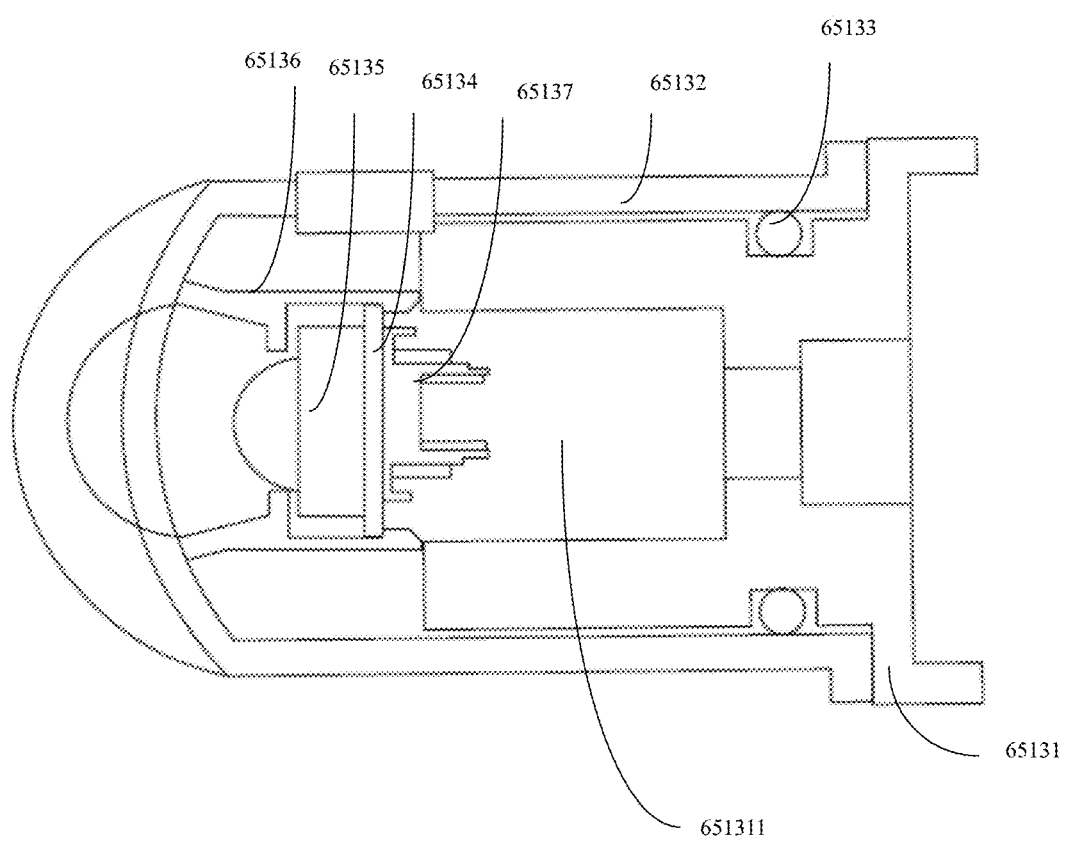
FIG. 11 is a sectional view of an illuminating light of the camera device according to one embodiment of the present invention.

As shown in FIG. 11, in the preferred example of the present invention, in order to increase the illumination during the shooting process, an illumination unit may be added to the camera device 61 to supplement illumination, and the camera device 61 can be specifically configured as follows: comprising an illumination unit 6513, fixedly connected to the lower side of the camera device module 6512 and placed in the camera device housing 6511, which can be connected with the camera device housing though the lugs disposed outside the base of the illumination unit. Certainly, the base of the illumination unit can be integrally formed with the rear cabin of the camera device housing to increase the overall stability.

Further, the illumination unit 6513 comprises: a base 65131, having a holding cavity 651311 at the front, and a wire hole at the back communicating the holding cavity 651311, through which a corresponding electric transmission wire can pass; and a cylindrical lampshade 65132 provided behind the base 65131, sealed and connected by a third sealing rubber ring 65133, wherein the connection can be fastened by screws.

Preferably, the illumination unit 6513 further comprises: a PCB 65134, arranged on the base 65131 and connected with corresponding electric wires, which can be printed with corresponding control circuits; a heat dissipation module 65134, arranged on the back surface of the PCB 65134 and located in the holding cavity 651311, the heat dissipation module comprising a plurality of heat dissipation fins, preferably made of copper or aluminum; and at least one LED light 65136, arranged on the front surface of the PCB 65134, wherein the on-off of the LED light is controlled by the PCB circuit.

According to one example of the present invention, it is preferred to further comprise a reflector 65137, arranged outside the LED light 65136 and fixed on the PCB 65134 by a snap or a hook. The reflector has the effect of light distribution. According to the illumination direction of the LED, the reflector at a certain angle concentrates beams of light to illuminate at some position to increase the use rate of light energy. The material of the reflector is usually selected from aluminum, silver or hard reflective plastic.

According to one example of the present invention, preferably, the rotating arm 652 is similar to a curved hook structure, comprising two symmetrical arm claws 6521, rotatably connected to the camera device 61 through the bolt 651223, wherein the camera device 61 rotates about the bolt 651223.

Preferably, the rotating arm 652 has at the front end a holding space matching the shape of the camera device housing 6511. When the camera device 61 is at the initial position, the rotating arm 652 is in seamless connection with the camera device 61. And the lens and the illumination unit of the camera device are exposed through the holding space to fulfill the shooting and lighting functions.

Figure 13:
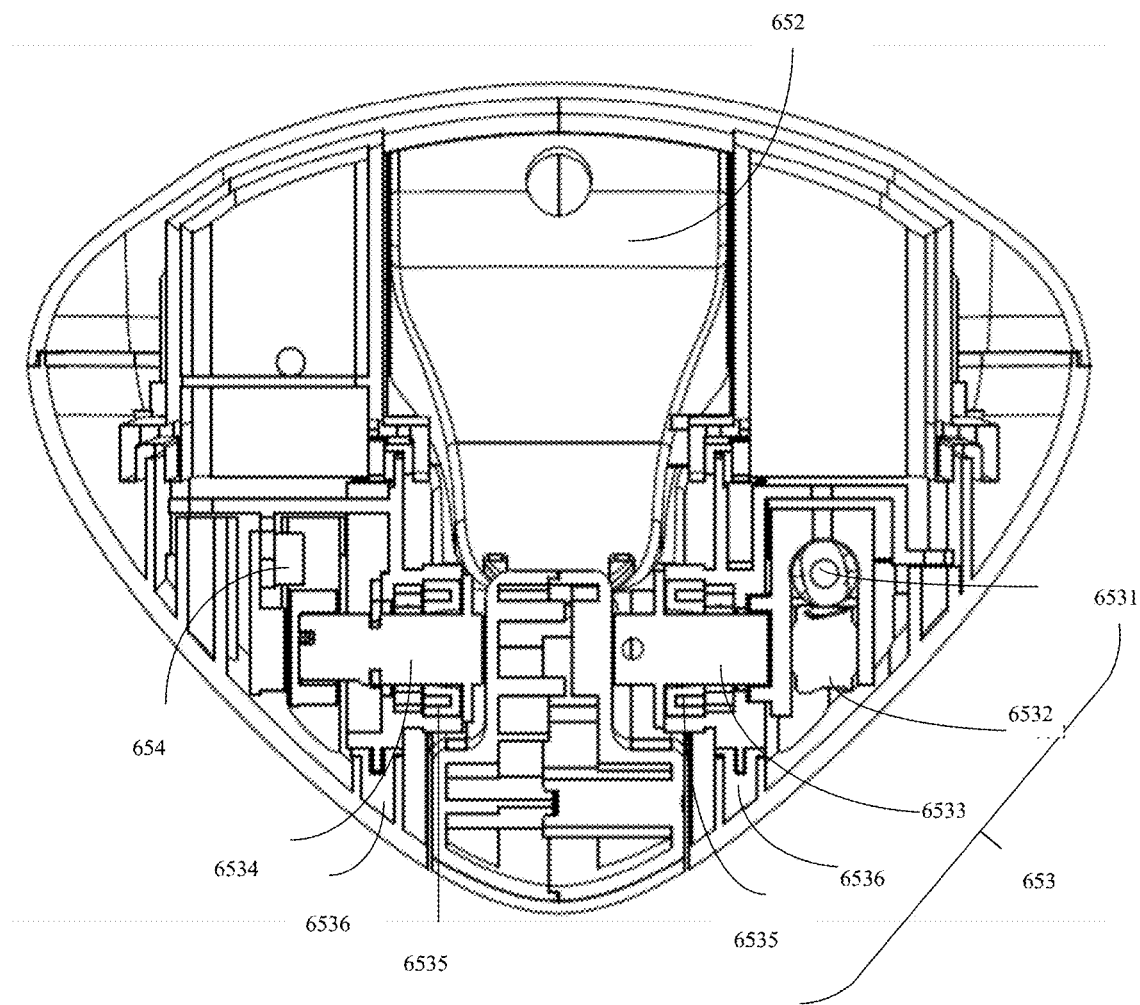
FIG. 13 is a sectional view of a driving mechanism of the camera device according to one embodiment of the present invention.

Preferably, as shown in FIG. 13, the driving mechanism 653 is arranged on the hull of the unmanned boat, specifically adjacent to the rotating arm part, comprising: a motor 6531, arranged at the end of the hull, wherein the forward or reverse rotation thereof is controlled by a remote control device to drive the rotating arm to open and close; a connecting driving piece 6532, specifically comprising a cam connected with the motor 6531 and configured to rotate as the motor 6531 rotates; and a transmission shaft 6533, connected to the cam 6532 and configured to rotate as the connecting driving piece 6532 rotates, wherein the cam, because of its asymmetric structure, can drive the rotation of the transmission shaft in the process of rotation; and wherein the motor 6531 and the cam are placed in a holding cavity, and the transmission shaft 6533 extends into the holding cavity to connect with the cam. It further comprises a driven shaft 6534, which is riveted with the transmission shaft 6533 and rotates as the transmission shaft 6533 rotates; both the transmission shaft 6533 and the driven shaft 6534 are rotatably connected to the rotating arm 652 through a bearing 6535. The driven shaft 6534 is provided with a wire hole, through which the communication and electric wires in the camera device are connected with the unmanned boat.

Further, to achieve waterproof effect, the transmission shaft 6533, the driven shaft 6534 and the bearing 6535 are sealed therebetween by a fourth sealing rubber ring 6536, respectively.

According to one embodiment of the present invention, the camera device with a switchable angle of view further comprises: an angle positioner 654, installed on one side of the rotating arm 652 opposite the driving mechanism 653 and held in another holding space. The communication wire passes through this holding space to connect with the control system, and the angle positioner 654 monitors the rotation angle of the rotating arm in real time, and feeds back the rotation angle information of the rotating arm 652 to the control system. Then the control system generates control information according to the feedback information, and controls the driving mechanism 653 to adjust the rotation angle of the rotating arm 652. For example, when it is necessary to reset the rotating arm 652, there may be a deviation of 0-5 degrees due to the influence of the mechanical elements or components themselves. By then, the deviation position information is obtained by the angle positioner 54, which is fed back to the control system. And the control system then controls the tiny rotation of the motor to achieve perfect resetting at last. In the same way, according to the actual situation, the camera device can be accurately rotated to a preset position to fulfill the shooting of a target.

Preferably, the second angle is 0 to 100 degrees. That is to say, the rotating arm can rotate to any position downward from the initial position by 0-100 degrees. Meanwhile, the camera device itself can rotate by 115 degrees, such that the camera device can shoot a target at any angle under the main body of the unmanned boat.

Compared with the prior art, the solutions described above in the embodiments of the present invention at least have the following beneficial effects:

The camera device with a switchable angle of view described herein can rotate in two degrees of freedom. On the one hand, it rotates in the range of 0-115 degrees by the rotation axis of the camera device, and the initial position is at a position downward from the horizontal plane by 35 degrees, which basically satisfies conventional shooting. When it is necessary to shoot a target on the water surface, the camera device with a switchable angle of view can be rotated upward, and to a position obliquely upward by at most 80 degrees from the horizontal line, which basically can shoot a target in any direction above the hull of the unmanned boat in combination with the wide angle of view of the camera lens itself. On the other hand, by rotation of the rotating arm, the rotating arm can rotate by 0-100 degrees downward from the initial position. In this way, a target at any position under the hull of the unmanned boat can be basically photographed in combination with the self-rotation of the camera device with a switchable angle of view. Therefore, in combination of the rotation of the above two dimensions, the camera device with a switchable angle of view of the present invention can photograph targets by 360 degrees around the hull of the unmanned boat, thereby greatly enhancing the shooting range and bringing excellent shooting effect for underwater shooting.

Embodiment 2

Figure 14:
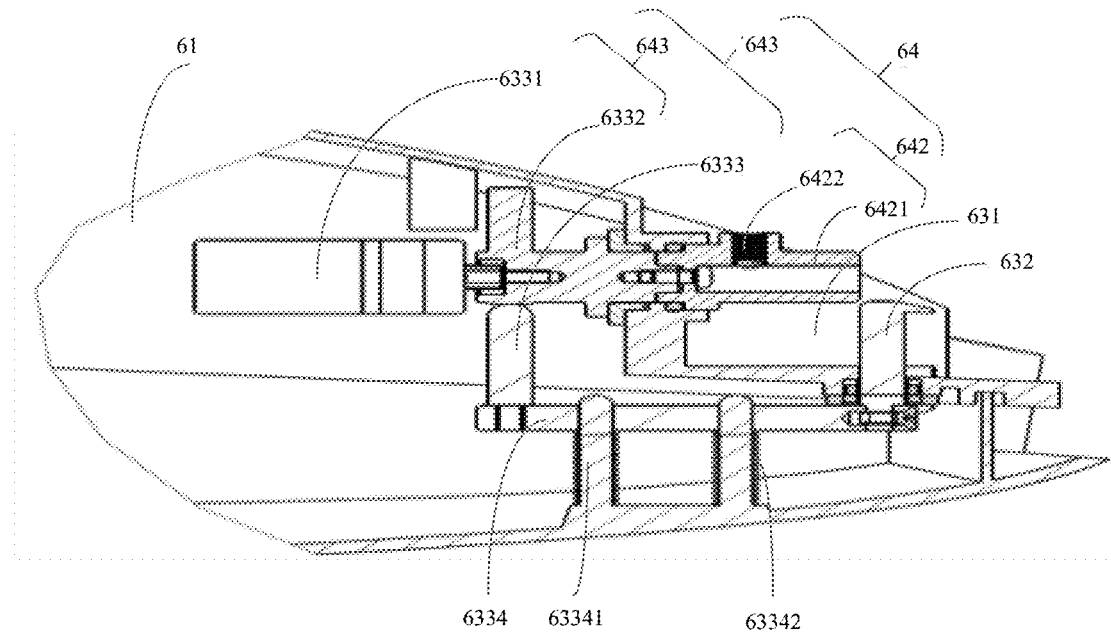
FIG. 14 is a sectional view of a closed towing hook device according to one embodiment of the present invention.
Figure 15:
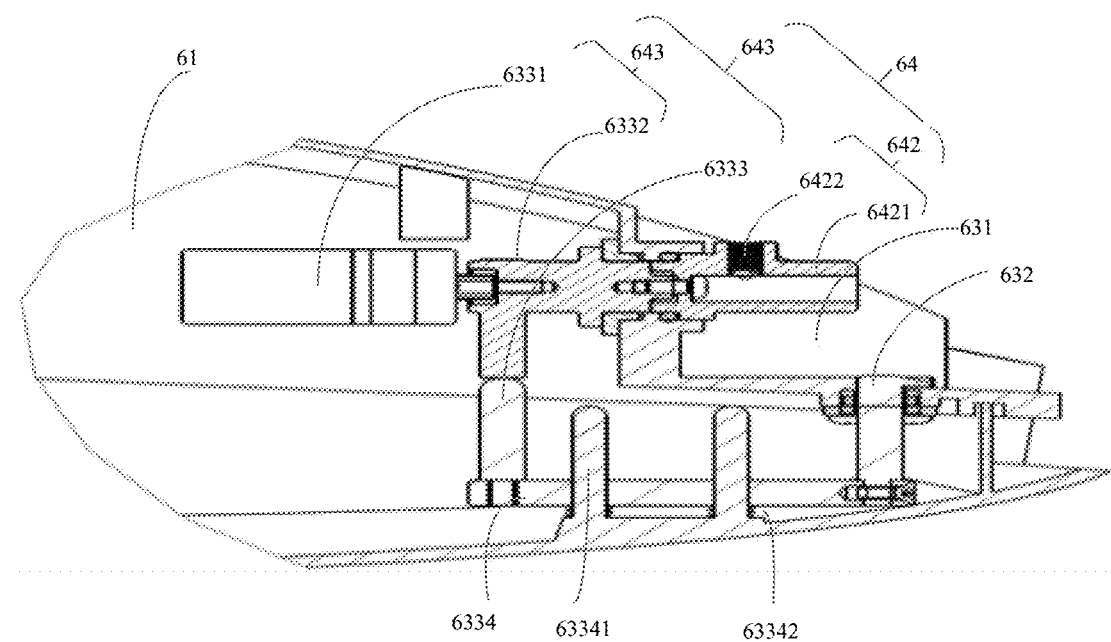
FIG. 15 is a sectional view of an opened towing hook device according to one embodiment of the present invention.

As shown in FIGS. 14-15, the example of the present invention further provides an unmanned boat, specifically comprising: an unmanned boat main body, a propeller system, a battery system, a GPS positioning module, a control system and any one of the camera devices with a switchable angle of view as described above. Among them, the camera device with a switchable angle of view will not be specifically described below.

In this embodiment, the camera device with a switchable angle of view is arranged at the front end of the unmanned boat. Because the rotating arm is designed in a hook form similar to the front end of the hull, when the rotating arm is in the initial position, the camera device with a switchable angle of view forms an integral structure with the hull of the unmanned boat, such that the camera lens and the illumination unit are aimed at a certain angle under the water for shooting.

Preferably, when the camera device with a switchable angle of view is in the initial position, the camera device 61 is oriented to a direction obliquely downward from the horizontal plane by 35 degrees; when the camera device 61 is rotated upward, the rotation angle ranges from 0 to 80 degrees. The rotating arm 2 can rotate by 0 to 100 degrees obliquely downward from the initial position.

Preferably, the camera device 61 is a wide-angle camera device. By means of the self-rotation of the camera device 61 and the rotation of the rotating arm 62, the field of view of the camera device 61 covers the entire space above and below the hull of the unmanned boat.

The propeller system comprises a propeller motor, a driving shaft and a screw propeller. The motor of the propeller can control the forward or reverse rotation independently to drive the screw propeller to rotate by the driving shaft to complete advance, retreat, turning and other movements of the unmanned boat. The screw propeller part may comprise a grid structure to prevent sundries such as aquatic plants from entering and causing damage to the propulsion system.

The battery system provides power supply for the entire unmanned boat, and is a core part of the entire unmanned boat. Because the unmanned boat is an underwater device, it is necessary to perform sealing and waterproof design for every part of the unmanned boat to prevent leakage and short circuit. The battery system can adopt a structure of multiple electric cells in series or parallel connection. Among them, the charging circuit is preferably designed as Quick Charge and simultaneously provided with an anti-overcharge protection circuit. The battery system is designed as a quick-release snap structure to make it convenient to charge the battery. Certainly, the battery can also be designed as a structure integrated with the unmanned boat, and this will further improve the waterproof performance. The battery system transmits the voltage transformed by a transformer to the rotating motor, the propeller motor, the illumination unit and other parts.

The unmanned boat further comprises a central control system receiving a control signal sent by an external remote-control device. The external control can send a control command by the cell phone APP or a hand gesture, and then the control signal is received by a wireless receiving system of the unmanned boat, to further feed back the control information to a part that is required to be actuated.

As shown in FIGS. 14-15, the embodiment of the present invention provides a surface-navigating robot, which can specifically comprise:

a robot main body 61; at least one propeller 62 comprising: a propulsion cabin 621, integrally formed with the robot main body 61; a propulsion motor 622, located in the propulsion cabin 621; a screw propeller 623, connected with the propulsion motor 622 by a driving shaft 624; an anti-swing arm 625, laterally extending outward along the propulsion cabin 621; and a towing hook device 63, arranged at the tail of the robot main body 61 and used for towing and releasing an external load.

Preferably, the towing hook device 63 comprises: a closed cabin 631; an outer cabin pin 632, serving as an integral part of the closed cabin 631 and capable of being opened or closed; and a driving unit 633, capable of driving the outer cabin pin 632 to move up and down. The outer cabin pin 632 forms a small part of the closed cabin 631, through which a load rope sling can be mounted, and redundant load hangers can be placed in the closed cabin 631. The whole is sealed with a waterproof ring, and the structure is simple and easy to operate.

Preferably, the driving unit 633 comprises: a steering engine 6331, providing rotation movement; a connecting driving piece 6532332, connected with the steering engine 6331 and driven by the steering engine 6331 to rotate; an inner cabin pin 6333, connected with the cam and moving downward following the rotation of the cam; a support mechanism 6334, horizontally connected the inner cabin pin 6333 and the outer cabin pin 632.

Among them, the support mechanism 6334 further comprises: at least one guide post 63341, supporting the support mechanism 6334 in a vertical direction, the support mechanism 6334 moving downward as the inner cabin pin 6333 moves downward; and at least one elastic part 63342, sleeved on the guide post 63341 and providing the support mechanism 6334 with a return force. The elastic part 63342 can be a spiral spring or the like.

The mechanical release spring-back mechanism is simple in structure, which is achieved using an existing steering control mechanism. The structure of two mechanisms included in one is integrated with multiple functions, and the mechanical structure is simple and easy to operate. In addition, the surface-navigating robot of the present invention has a simple load release hook, which can increase additional loads, and can be simply released by the remote-control device when necessary.

Embodiment 3

Figure 16:
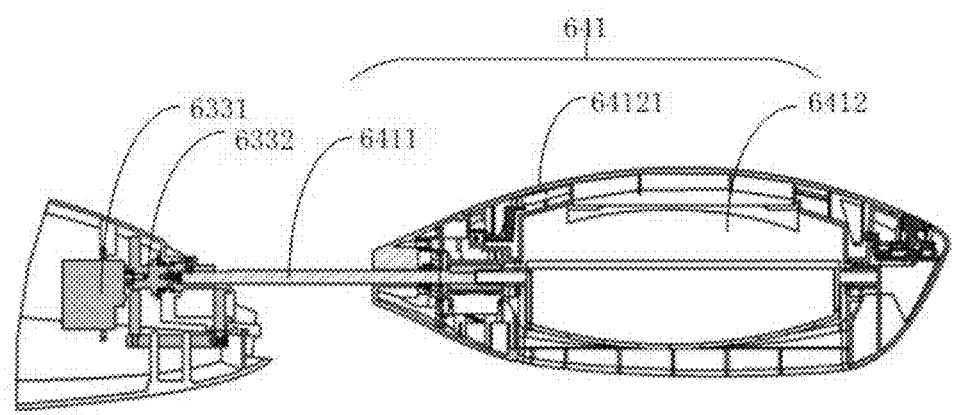
FIG. 16 is a structural diagram of a bait device according to one embodiment of the present invention.

As shown in FIG. 16, the embodiment of the present invention also provides a drone, specifically comprising: a drone main body, a propulsion system, a battery system, a GPS positioning module, a control system and any one of the camera devices with a switchable angle of view as described above. Among them, the camera device with a switchable angle of view will not be specifically described below.

In this embodiment, the camera device with a switchable angle of view is arranged at the front end or the lower end of the drone. The shape of the rotating arm is designed to match the shape of the drone main body. When the rotating arm is in the initial position, the camera device with a switchable angle of view forms an integral structure with the drone, and aims the camera lens and the illumination unit at a lower position at a certain angle for shooting.

Preferably, when the camera device with a switchable angle of view is in the initial position, the camera device 61 is oriented at a direction obliquely downward from the horizontal plane by 35 degrees; when the camera device 61 is rotated upward, the rotation angle ranges from 0 to 80 degrees. The rotating arm 2 can rotate by 0 to 100 degrees obliquely downward from the initial position.

Preferably, the camera device 61 is a wide-angle camera device. By means of the self-rotation of the camera device 61 and the rotation of the rotating arm 62, the field of view of the camera device 61 covers the entire space above and below the body of the drone.

The propeller system comprises a propeller motor, a driving shaft and a screw propeller. The motor of the propeller can be controlled to perform forward or reverse rotation independently to drive the screw propeller to rotate by the driving shaft to complete advance, retreat, turning and other movements of the drone.

The battery system provides power supply for the entire drone, and is a core part of the entire drone. The battery system can adopt a structure of multiple electric cells in series or parallel connection. Among them, the charging circuit is preferably designed as Quick Charge and simultaneously provided with an anti-overcharge protection circuit. The battery system is designed as a quick-release snap structure to make it convenient to charge the battery. Certainly, the battery can also be designed as a structure integrated with the drone, and this will be more elegant. The battery system transmits the voltage transformed by a transformer to the rotating motor, the propeller motor, the illumination unit and other parts.

The drone further comprises a central control system receiving a control signal sent by an external remote-control device. The external control can send a control command by the cell phone APP or a hand gesture, and then the control signal is received by a wireless receiving system of the drone, further feeding back the control information to a part that is required to be actuated.

As shown in FIG. 16, the embodiment of the present invention provides a surface-navigating robot, comprising: a robot main body 61; at least one propeller 62 comprising: a propulsion cabin 621, integrally formed with the robot main body 61; a propulsion motor 622, located in the propulsion cabin 621; a screw propeller 623, connected with the propulsion motor 622 by a driving shaft 624; an anti-swing arm 625, laterally extending outward along the propulsion cabin 621; and a bait (placing) device system 64, arranged at the tail of the robot main body 61 and used for releasing a bait.

Preferably, the bait system 64 comprises a bait device main body 641; a fixing device 642, for fixing the bait device main body 641; and a driving system 643, providing rotation power.

Preferably, the bait device main body 641 comprises: a connecting rod 6411; a bait device cabin 6412, fixedly connected with the connecting rod 6411 and comprising a cabin door 64121 capable of being opened/closed automatically.

Preferably, the fixing device 642 comprises: a fixing sleeve 6421, having a holding space for holding the connecting rod 6411; a fixing bolt 6422, laterally passing through the fixing sleeve 6421 and abutted and fixed with the connecting rod 6411.

Preferably, the driving system 643 comprises: a steering engine 6331, providing rotation movement; and a connecting driving piece 6332, specifically comprising a cam connected with the steering engine 6331 and driven by the steering engine 6331 to rotate; wherein the cam is fixedly connected with the fixing sleeve 6421, and the fixing sleeve 6421 rotates following the rotation of the cam 6332.

Preferably, a fish detector 66 is further included, which is screwed to the lower part of the robot main body 61.

Preferably, the fish detector 66 comprises a sonar device, for detecting underwater targets.

The connecting mechanism of the bait device of the surface-navigating robot of the present invention is also simple and easy to operate, and can facilitate release of a bait to a designated position. In addition, the surface-navigating robot of the present invention is also combined with a fish detector, GPS and other communication devices, and this can ensure the free navigation of the aquatic vehicle.

Embodiment 4

This embodiment can be configured independently or in combination with the above Embodiments 1-3, and no more detailed description of the repeated parts will be made below.

As shown in FIG. 5, according to the embodiment of the present invention, provided is a surface-navigating robot, comprising: a robot main body 61; at least one propeller 62, comprising: a propulsion cabin 621, integrally formed with the robot main body 61; a propulsion motor 622, located in the propulsion cabin 621; a screw propeller 623, connected with the propulsion motor 622 by a driving shaft 624; an anti-swing arm 625, laterally extending outward along the propulsion cabin 621; and an identification light 67, arranged at the rear of the robot.

Further preferably, the identification light 67 is arranged on the propellers on both sides of the robot, or arranged in a circle about the anti-swing arm 625.

Further, the identification light 67 has three colors of red, yellow and green for identifying an operating state or power state of the robot. For example, it will be shown in green when the robot is in a good state; yellow when in an alarming state; and red when in a state of serious alarm. Or, when the power is sufficient (e.g., more than 50%), it will be shown in green; when the power is insufficient (e.g., 20-50%), it will be shown in yellow; and when the power is seriously insufficient (e.g., less than 20%), it will be shown in red. Such percentages can be defined at one's option without any special limitation.

The identification light 67 can be formed using an energy-saving LED waterproof light and embedded on the hull outside the propellers.

The identification light 67 added in this example can be skillfully arranged to match the profile of the propeller system. On the one hand, the arrangement around the periphery of the propeller system can increase the elegance of the underwater robot; on the other hand, the definition of the state in different colors can identify the operating state or power state of the underwater robot, thereby meeting the requirements for aesthetics and practicability.

The features shown in FIGS. 5-16 of the present invention and the corresponding contents in the description can be combined with those in FIG. 1-4 and the corresponding contents in the description.

The present invention also provides a towing hook device that can be used in an aquatic vehicle. The detailed description of the preferred examples of the present invention will be made below with reference to the drawings.

Figure 17:
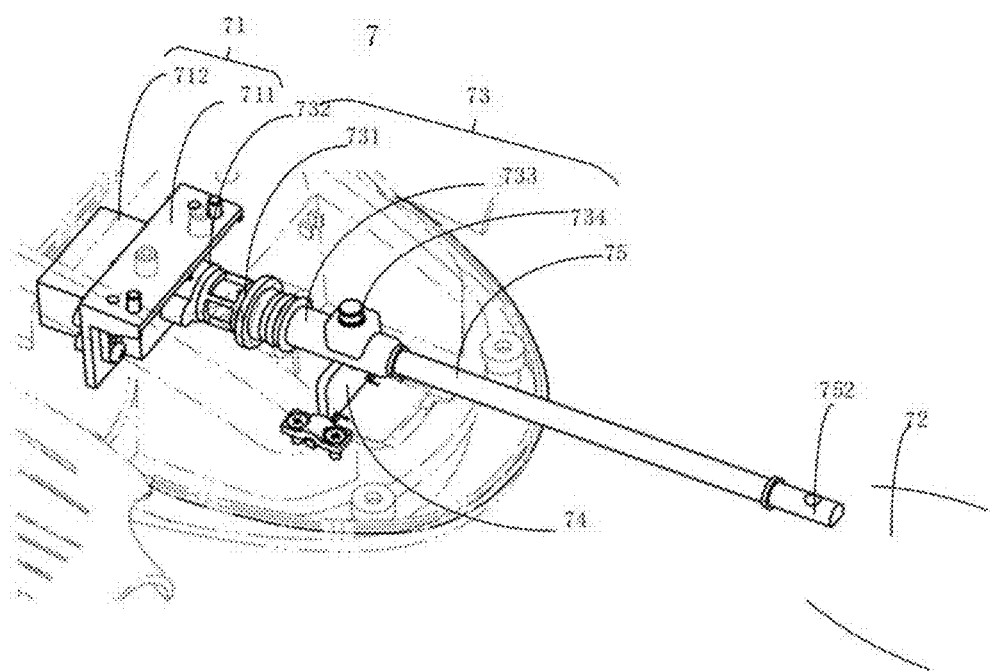
FIG. 17 is a structural diagram of a towing hook device according to one embodiment of the present invention.
Figure 18:
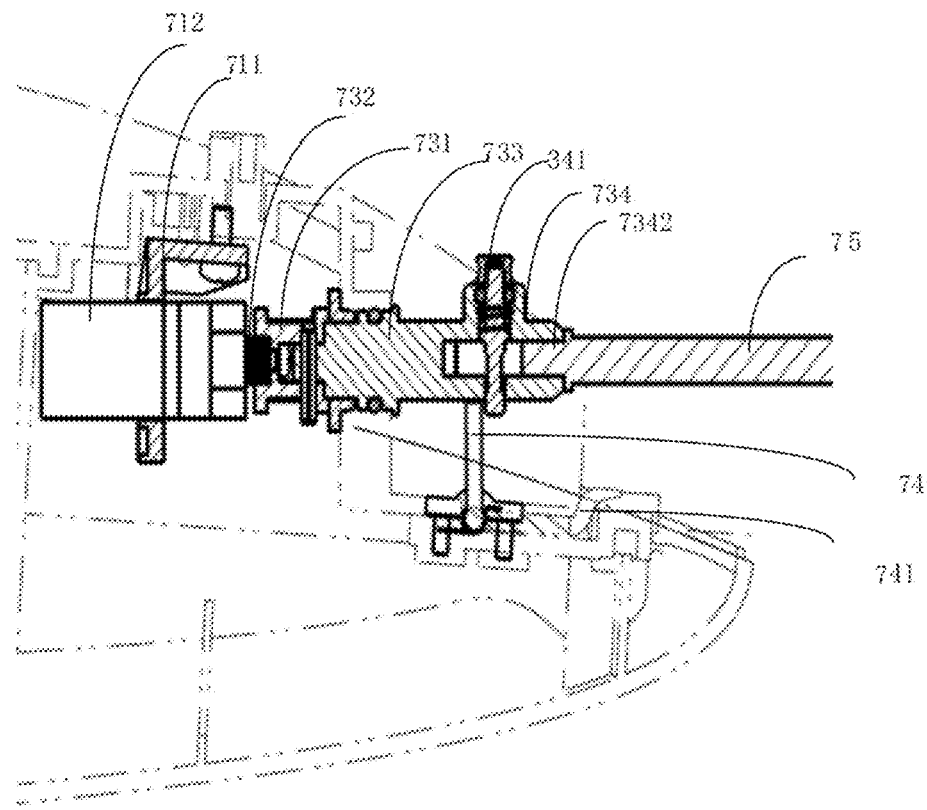
FIG. 18 is a sectional view of the towing hook device according to one embodiment of the present invention.

As shown in FIGS. 17-18, a towing hook device 7 provided in the example of the present invention comprises: a driving system 71 for providing rotatory driving force, comprising: a steering engine bracket 711, fixed at the tail of the main body to provide support; and a steering engine 712, fixed on the steering engine bracket 711; at least one load piece 72, which is connected with the driving system 71 and may be connected and released under the action of the driving system 71; and a connecting mechanism 73, for connecting the driving system 71 and the load piece 72.

Among them, the steering engine 712 can provide a driving control force which can have a varying angle and can be maintained. The steering engine 712 is fixed on the steering engine bracket 711 by screws, and is fixed below the cabin cover at the tail of the main body. The whole is designed as a sealed and waterproof structure.

In particular, the at least one load piece 72 comprises: a fish line, a lifebuoy rope or any object that can be dragged. The object is mounted externally when the aquatic vehicle is launched into water, and released by the towing hook device through automatic or manual control when necessary. The towing hook device is mainly used to mount fishing lines, lifebuoys, hooks and ropes, and also to mount and deliver buoys, marine locator beacons, small-scale marine emergency rescue equipment, etc. For applicable scenarios, anything that meets the basic requirements for weight and buoyancy and needs to be dragged and delivered can be used as a load.

According to the embodiment of the present invention, the connecting mechanism 73 may comprise: a steering engine adapter 731, connecting the steering engine output shaft and the connecting shaft by means of snapping or cogging, or otherwise, the steering engine adapter 731 having a diameter greater than those of the steering engine output shaft 732 and the connecting shaft 733, wherein the steering engine output shaft 732 and the connecting shaft 733 can be fixed just after inserted into the steering engine adapter 731; the steering engine output shaft 732 directly transfers the rotation driving force of the steering engine 712, and the connecting shaft 733 is mainly used for adapting a connecting piece of an external load. Meanwhile, it may comprise an adapting shaft 734, fixed on the connecting shaft 733, the adapting shaft 734 laterally arranged on the connecting shaft 733, wherein the adapting shaft can be integrally formed with the connecting shaft 733, or fixed on the connecting shaft 733 by welding or snapping, as shown in FIG. 17 or 18. The steering engine adapter 731, the steering engine output shaft 732 and the connecting shaft 733 are designed waterproof through a combination of grease, supporting shaft sleeves and O-rings.

As shown in FIGS. 17-18, according to the embodiment of the present invention, the adapting shaft 734 comprises a built-in spring pull pin 7341, arranged in the adapting shaft 734, movable up and down and used to fix or release the at least one load piece 72.

Figure 19:
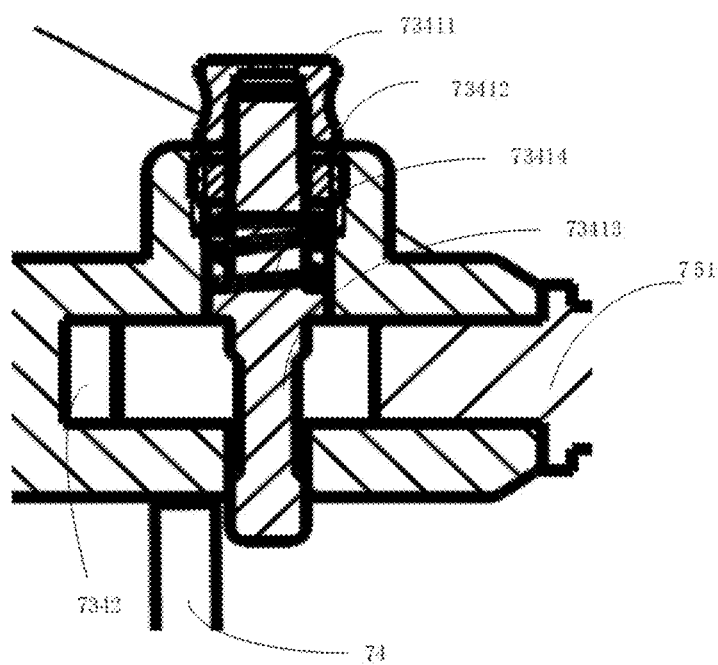
FIG. 19 is a structural diagram of a spring pull pin of the towing hook device according to one embodiment of the present invention.

In particular, as shown in FIG. 19, the spring pull pin 7341 comprises: a pull pin handle 73411, shaped in a round handle or a pull ring for the purpose of easy pulling; and further comprises a thicker pull pin big-diameter portion 73412, shaped in a cylinder or a prism, wherein when the spring pull pin 7341 is lowered, the pull pin big-diameter portion 73412 is embedded into a corresponding notch on the pull rod of the bait device to achieve the locking of the pull rod of the bait device, that is to say, the shape of the pull pin big-diameter portion 73412 should be adaptive to the notch on the pull rod. It also comprises a thinner pull pin small-diameter portion 73413, wherein when the spring pull pin 7341 is lifted, the pull pin small-diameter portion 73413 allows for the passage of the corresponding notch on the pull rod of the bait device, preferably in a shape the same as the pull pin big-diameter portion 73412; and after the spring pull pin 7341 is lowered, the pull pin small-diameter portion 73413 abuts against at the top end of a turnover plate 74; it also comprises a pull pin spring 73414, placed between the pull pin handle 73411 and the pull pin big-diameter portion 73412, preferably a spiral spring for providing a better return force.

Further, a turnover plate 74 is also provided under the adapting shaft 734, which may be in a rectangular or semi-circular structure, abutting under the connecting shaft 733, and comprising: a torsional spring 741, wherein the turnover plate 74 turns over within a certain angle range. The turnover plate 74 can turn over within 90°. During manual installation of wires, the spring pull pin 7341 is lifted by hand, and then the spring pull pin 7341 will no longer block the turnover plate 74. Under the action of the torsional spring, the turnover plate turns clockwise by 90°. After the manual installation of wires, the turnover plate is turned counterclockwise by 90° by hand, and the spring pull pin is lowered to complete the installation. Prior to automatic wire loosing, when the turnover plate 74 is in a vertical state, it is abutted and fixed by the lower end of the pull pin small-diameter portion 73413, and the rope device is abutted within the turnover plate 74. Driven by the steering engine, the connecting shaft rotates by 90°; at this time, when the pull pin small-diameter portion 73413 is driven by the connecting shaft to rotate by 90°, thereby playing no more role in abutting against the turnover plate 74, the turnover plate 74 rotates by 90° under the action of the torsional spring 741, and the rope and other components are released to achieve the automatic wire loosing.

The towing hook device provided by this embodiment is not complicated in structure as it can provide comprehensive mounting and releasing of load pieces only by a system driven by a steering engine; and it can increase additional loads, and can achieve simple release by a remote-control device when necessary. The towing hook device of the present invention is simple and easy to operate, and can facilitate release of a bait to a designated position.

The example of the present invention also provides a connecting structure, comprising: a driving system 71, for providing a driving force for rotation; a connecting shaft 733, connected to the driving system and rotating according to the driving force, a connecting hole 7342, located at the end of the connecting shaft 733 and extending along the axial direction of the connecting shaft 733, the connecting hole having a diameter greater than that of a connecting rod; a spring pull pin 7341, located in the connecting shaft 733 and arranged vertical to the connecting shaft 733; and a connecting rod 75, insertable into the connecting hole 7342 for connecting the load piece 72.

Among them, the driving system 71 comprises: a steering engine bracket 711, fixed at the tail of the main body to provide support; and a steering engine 712, fixed on the steering engine bracket 711. The steering engine 712 can provide a driving control force which can have a varying angle and can be maintained. The steering engine 712 is fixed on the steering engine bracket 711 by screws, and is fixed below the cabin cover at the tail of the main body. The whole is designed as a sealed and waterproof structure. In particular, the at least one load piece 72 comprises: a bait device or any object that can be dragged.

According to the embodiment of the present invention, the connecting mechanism 73 may comprise: a steering engine adapter 731, connecting the steering engine output shaft and the connecting shaft by means of snapping or cogging, or otherwise, the steering engine adapter 731 having a diameter greater than those of the steering engine output shaft 732 and the connecting shaft 733, wherein the steering engine output shaft 732 and the connecting shaft 733 can be fixed just after inserted into the steering engine adapter 731; the steering engine output shaft 732 directly transfers the rotation driving force of the steering engine 712, and the connecting shaft 733 is mainly used for adapting and connecting a connecting piece of an external load. Meanwhile, it may comprise an adapting shaft 734 fixed on the connecting shaft 733, the adapting shaft 734 laterally arranged on the connecting shaft 733, wherein the adapting shaft can be integrally formed with the connecting shaft 733, or fixed on the connecting shaft 733 by welding or snapping, as shown in FIG. 17 or 18. The steering engine adapter 731, the steering engine output shaft 732 and the connecting shaft 733 are designed waterproof through a combination of grease, supporting shaft sleeves and O-rings.

As shown in FIGS. 17-18, according to the embodiment of the present invention, the adapting shaft 734 comprises a built-in spring pull pin 7341, arranged in the adapting shaft 734, movable up and down and used to fix or release the at least one load piece 72.

In particular, as shown in FIG. 19, the spring pull pin 7341 comprises: a pull pin handle 73411, shape in a round handle or a pull ring for the purpose of easy pulling; and further a thicker pull pin big-diameter portion 73412, shaped in a cylinder or a prism, wherein when the spring pull pin 7341 is lowered, the pull pin big-diameter portion 73412 is embedded into a corresponding notch on the pull rod of the bait device to achieve the locking of the pull rod of the bait device, that is to say, the shape of the pull pin big-diameter portion 73412 should be adaptive to the notch on the pull rod. It also comprises a thinner pull pin small-diameter portion 73413, wherein when the spring pull pin 7341 is lifted, the pull pin small-diameter portion 73413 allows for the passage of the corresponding notch on the pull rod of the bait device, preferably in a shape the same as the pull pin big-diameter portion 73412; and after the spring pull pin 7341 is lowered, the pull pin small-diameter portion 73413 abuts against at the top end of a turnover plate 4; it also comprises a pull pin spring 73414, placed between the pull pin handle 73411 and the pull pin big-diameter portion 73412, preferably a spiral spring for providing a better return force.

According to the specific example of the present invention, the spring pull pin 7341 may further comprise: a pull pin handle 73411, shaped and structured to be suitable for easy dragging. It further comprises: a pull pin big-diameter portion 73412, embedded into a corresponding notch on the connecting rod 75 when the spring pull pin 7341 is lowered, thereby locking the connecting rod 75; a pull pin small-diameter portion 73413, allowing for the passage of the corresponding notch on the connecting rod 75 when the spring pull pin 7341 is lifted; and a pull pin spring 73414, provided between the pull pin handle 73411 and the pull pin big-diameter portion 73412.

Figure 20:
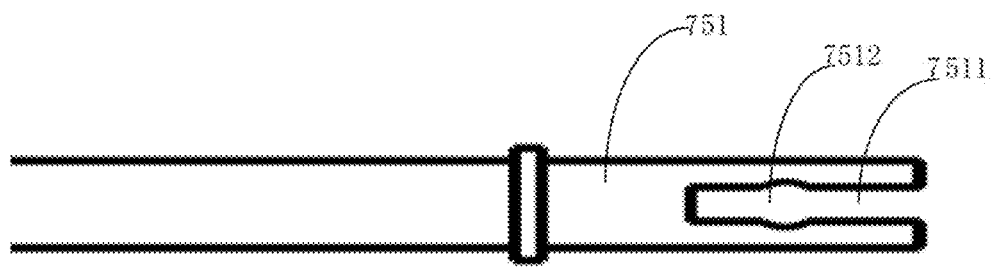
FIG. 20 is a structural diagram of a first end of the pull rod according to one embodiment of the present invention.
Figure 21:
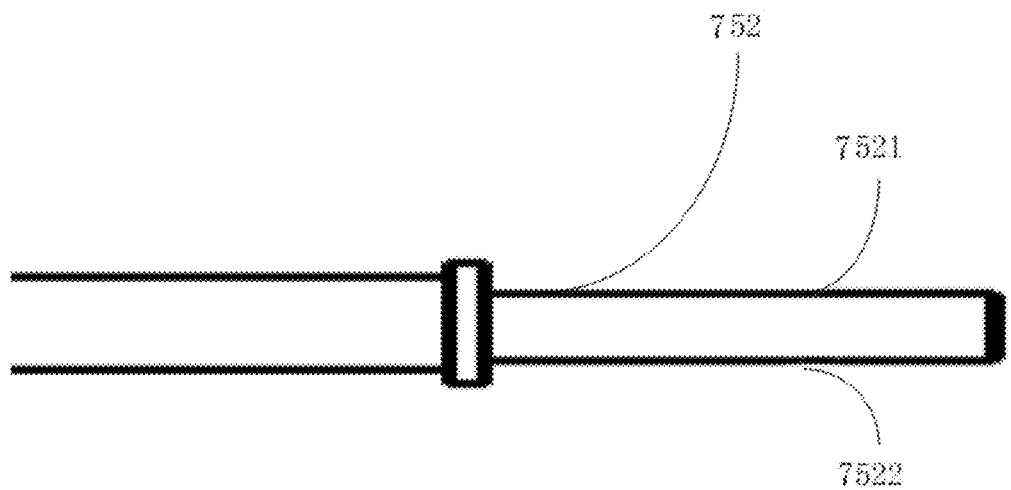
FIG. 21 is a structural diagram of a second end of the pull rod according to one embodiment of the present invention.

According to the embodiment of the present invention as shown in FIGS. 20-21, it further comprises a bait device connection rod 75, comprising a first end 751 inserted into the connecting hole 7342 and a second end 752 connected with the bait device body. Among them, the first end 751 comprises: a first notch 7511, corresponding to the pull pin small-diameter portion 73413, wherein when the pull rod is installed, the spring pull pin 7341 is lifted, and then the pull pin small-diameter portion 73413 is exactly aligned with the first notch 7511, thereby allowing the smooth passage of the pull pin small-diameter portion 73413. Because the first notch 7511 is sunk inward for a certain distance longitudinally along the first end, the pull rod can be longitudinally inserted into the connecting shaft 733. The first end of the pull rod also comprises a second notch 7512, laterally sunk inward along both sides of the first notch 7511 and having a bore diameter slightly greater than the first notch and corresponding to the pull pin big-diameter portion 73412.

When the pull rod enters into a suitable position of the connecting shaft 733, the spring pull pin 7341 is put down, and then the pull pin big-diameter portion 73412 is embedded into a position of the second notch, such that the bait device pull rod 75 can be locked. By this, the bait device pull rod has been installed.

Figure 22:
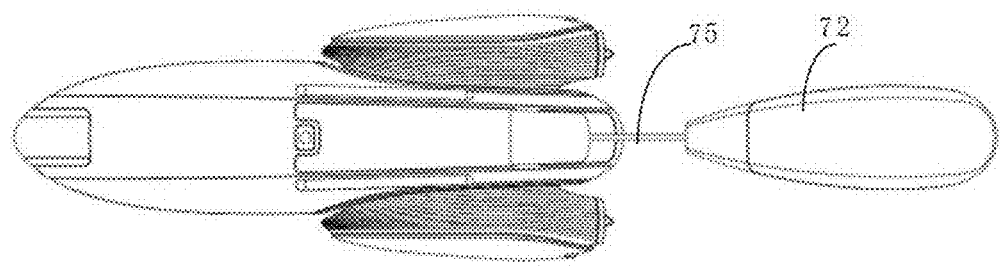
FIG. 22 is a structural diagram of an aquatic vehicle according to one embodiment of the present invention.
Figure 23:
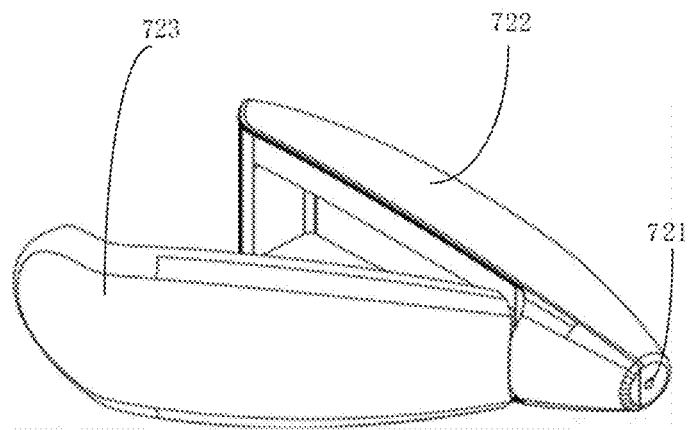
FIG. 23 is a structural diagram of a bait device of the aquatic vehicle according to one embodiment of the present invention.

As shown in FIG. 22, additionally, the second end 752 comprises an upper profile surface 7521 and a lower profile surface 7522, wherein the upper profile surface 7521 and the lower profile surface 7522 can be arranged symmetrically or asymmetrically, and can be planar or in other shapes. The upper profile surface 7521 and the lower profile surface 7522 are different in dimension, matched with the profile surfaces in the connecting shaft hole 721 of the bait device 72 to transfer torque. After inserted into the connecting shaft hole 21 of the bait device, the connecting rod 75 is stably connected with the housing 2 of the bait device 7. When the driving mechanism is twisted, the rotating shaft drives the connecting rod 75 to rotate, and then drives the housing 72 to tilt. At this time, the cover 723 of the bait device is separated from the bottom shell 722 by gravity, and a bait therein is released from the opening to water. When the driving mechanism is reversely twisted, the cover 723 is buckled with the bottom shell 722 under the action, returning to a closed state, and release of the bait is completed, as shown in FIG. 23.

The connecting structure of this example is not complicated in structure. By the ingenious structure design of the connecting rod of the bait device, the problem that mistakes are inclined to occur in the installation process can be avoided. By the structure design of turning a fixing device, the pull pin can control the installation of the pull rod of the bait device, simplifying the structure and improving the practicability.

As shown in FIG. 22, this embodiment provides an aquatic vehicle, specifically comprising: a main body, a propeller system, a battery system, a GPS positioning module, a control system and any one of the towing hook devices as described above. Among them, no more description of the structure of the towing hook device is made below.

In this embodiment, the towing hook device is arranged at the tail of the main body for dragging a load, which can be used for dragging and hanging fish line, hook, rescue materials, etc. After a user transports the materials to a designated position, the towing hook device is released, and the transported materials will fall off from the main body themselves. There is no specific limitation of the number of the towing hook device, and 1 to 3 of the same can be arranged according to the specific structure of the aquatic vehicle, or suitably, in a number sufficient to drag the load. The towing hook device is disposed on the main body by means of welding or integrated formation process, preferably disposed on the inner side of the tail of the main body to be realized in a more concealed manner.

The propeller system comprises a propeller motor, a driving shaft and a screw propeller. The motor of the propeller can be controlled to perform forward or reverse rotation independently to drive the screw propeller to rotate by the driving shaft to complete advance, retreat, turning and other movements of the aquatic vehicle. The screw propeller part may comprise a grid structure to prevent sundries such as aquatic plants from entering and causing damage to the propulsion system.

The battery system provides power supply for the entire aquatic vehicle, and is a core part of the entire aquatic vehicle. Because the aquatic vehicle is an underwater device, it is necessary to perform sealing and waterproof design for every part of the aquatic vehicle to prevent leakage and short circuit. The battery system can adopt a structure of multiple electric cells in series or parallel connection. Among them, the charging circuit is preferably designed as Quick Charge and simultaneously provided with an anti-overcharge protection circuit. The battery system is designed as a quick-release snap structure to make it convenient to charge the battery. Certainly, the battery can also be designed as a structure integrated with the aquatic vehicle, and this will further improve the waterproof performance. The battery system transmits the voltage transformed by a transformer to the rotating motor, the propeller motor, the illumination unit and other parts.

The aquatic vehicle further comprises a central control system receiving a control signal sent by an external remote-control device. The external control can send a control command by the cell phone APP or a hand gesture, and then the control signal is received by a wireless receiving system of the aquatic vehicle, further feeding back the control information to a part that is required to be actuated.

Compared with the prior art, the above solutions in the examples of the present invention has at least the following beneficial effects:

A towing hook device according to the present invention has a straightforward structure, as it can provide comprehensive mounting and releasing of load pieces only by a system driven by a steering engine. By the ingenious structure design of the connecting rod of the bait device, the problem that mistakes are inclined to occur in the installation process can be avoided. By the structure design of turning a fixing device, the pull pin not only can control the rotation and release of the pull rod of the bait device, but also control the launch of ropes, thereby simplifying the structure and improving the practicability. This aquatic vehicle has a simple hook for load release, which can be added with extra loads and can perform easy release by a remote-control device when necessary. The connecting mechanism in the bait placing device of the aquatic vehicle according to the present invention is simple and easy to operate, and can facilitate release of a bait to a designated position.

As shown in FIGS. 24-28, a towing hook device 8 provided in the example of the present invention comprises: a driving system 81, for providing a driving force for rotation, comprising: a steering engine bracket 811, fixed at the tail of the main body to provide support; a steering engine 812, fixed on the steering engine bracket 811; and a wire installation part 83, for installing a connecting wire connecting to a carrier, the wire installation part 83 comprising a snapping piece 84 located below the connecting mechanism 83; wherein the driving system 81 drives the connecting mechanism 82 to rotate such that the snapping piece 84 turns over and drives the wire installation part 83 to rotate to release the carrier. The steering engine 812 can provide a driving control force which can have a varying angle and can be maintained. The steering engine 812 is fixed on the steering engine bracket 811 by screws, and is fixed below the cabin cover at the tail of the main body. The whole is designed as a sealed and waterproof structure.

In particular, the at least one load piece 82 comprises: any object that can be dragged by a fish line, a lifebuoy rope or the like, the object mounted externally when the aquatic vehicle is launched into water, and released by the towing hook device through automatic or manual control when necessary. The towing hook device is mainly used to mount fishing lines, lifebuoys, hooks and ropes, and also to mount and deliver buoys, marine locator beacons, small-scale marine emergency rescue equipment, etc. For applicable scenarios, anything that meets the basic requirements for weight and buoyancy and needs to be dragged and delivered can be used as a load.

Figure 24:
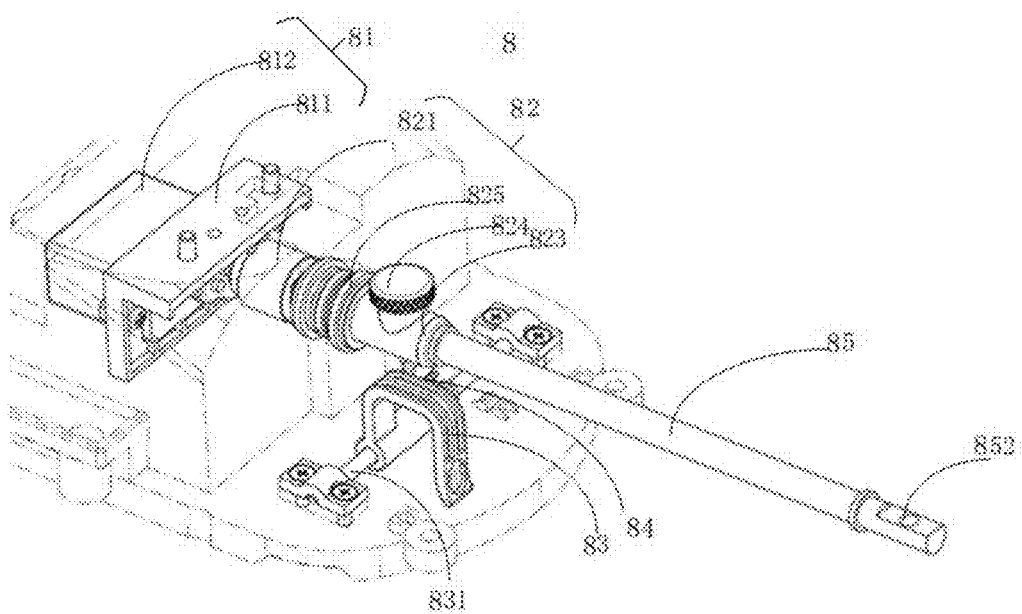
FIG. 24 is a structural diagram of an unturned-over baffle plate of the towing hook device according to one embodiment of the present invention.
Figure 25:
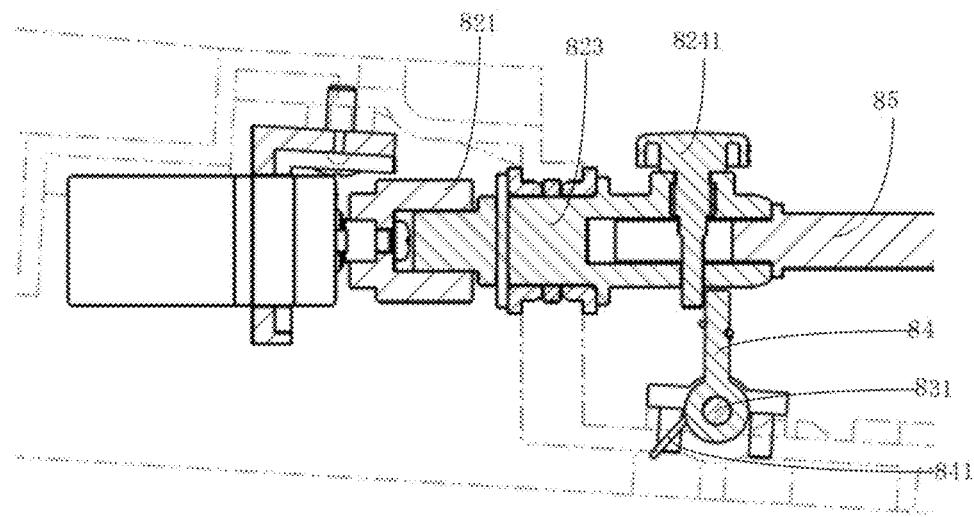
FIG. 25 is a sectional view of an unturned-over baffle plate of the towing hook device according to one embodiment of the present invention.
Figure 26:
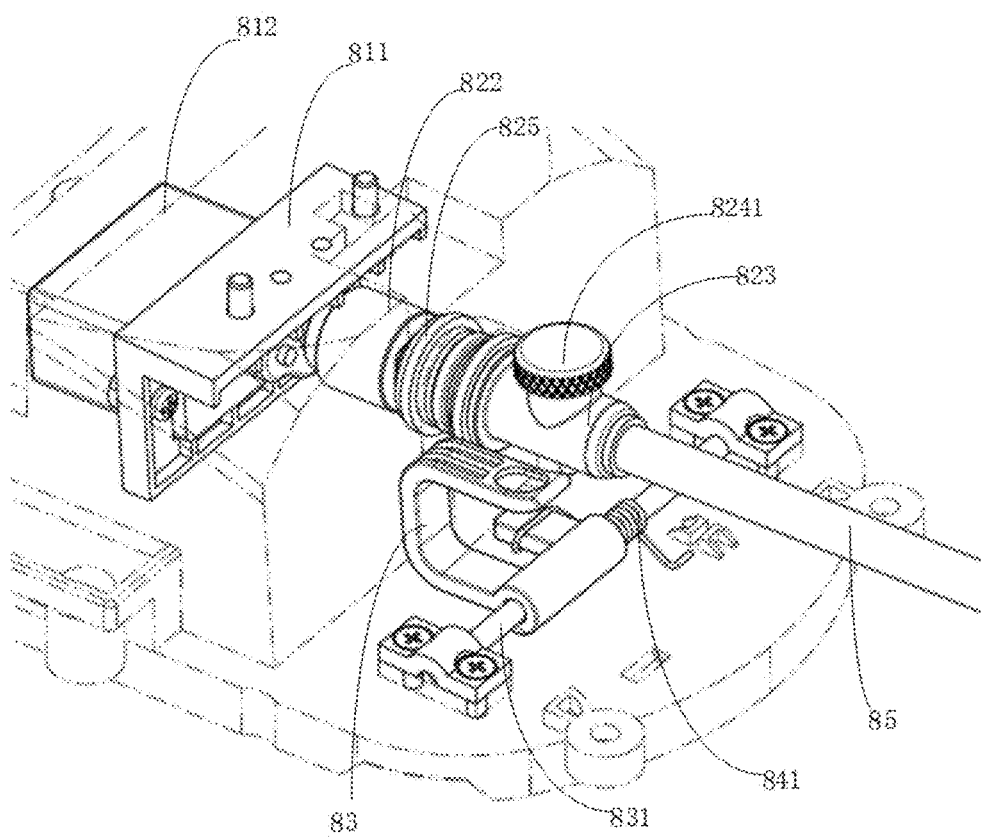
FIG. 26 is a structural diagram of the turned-over baffle plate of the towing hook device according to one embodiment of the present invention.
Figure 27:
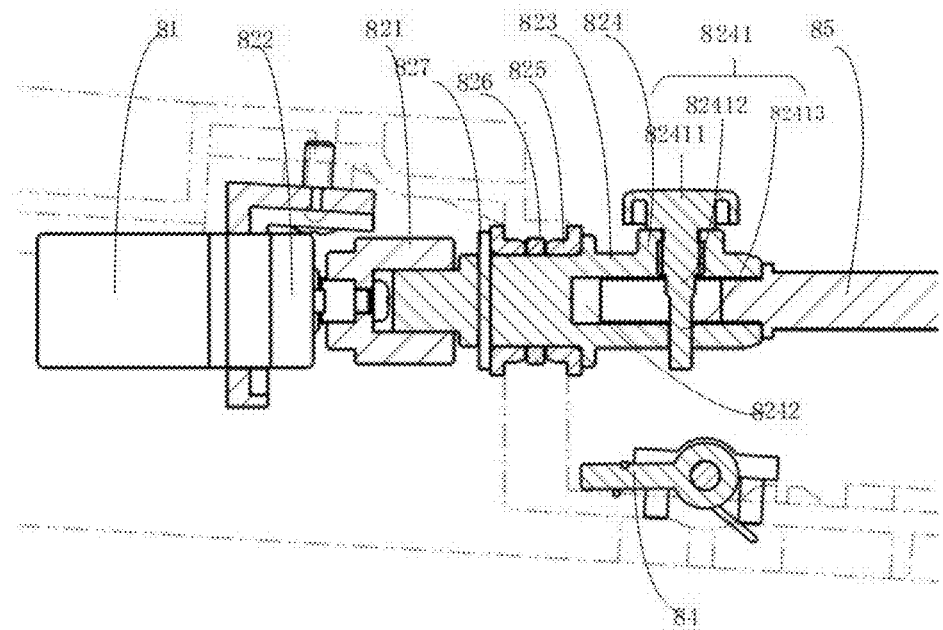
FIG. 27 is a sectional view of the turned-over baffle plate of the towing hook device according to one embodiment of the present invention.

According to the embodiment of the present invention, the connecting mechanism 82 may comprise: a steering engine adapter 821, connecting the steering engine output shaft 822 and the connecting shaft 823 by means of snapping or cogging, or otherwise, the steering engine adapter 821 having a diameter greater than those of the steering engine output shaft 822 and the connecting shaft 823, wherein the steering engine output shaft 822 and the connecting shaft 823 can be fixed just after inserted into the steering engine adapter 821; the steering engine output shaft 822 directly transfers the rotation driving force of the steering engine 812, and the connecting shaft 823 is mainly used for adapting and connecting a connecting piece of an external load. Meanwhile, it may comprise an adapting shaft 824 fixed on the connecting shaft 823, the adapting shaft 824 laterally arranged on the connecting shaft 823, wherein the adapting shaft can be integrally formed with the connecting shaft 823, or fixed on the connecting shaft 823 by welding or snapping, as shown in FIG. 24 or 25. The steering engine adapter 821, the steering engine output shaft 822 and the connecting shaft 823 are designed waterproof through a combination of grease, supporting shaft sleeves and O-rings.

Preferably, the connecting mechanism 82 further comprises: at least one supporting shaft sleeve 825, providing a radial support for the rotation of the connecting shaft 823. In particular, it comprises two supporting shaft sleeves 825, symmetrically arranged on the connecting shaft 823, and a sealing ring 826, arranged between the two supporting shaft sleeves 825, and working with grease to form dynamic seal in a low rotation speed state. In addition, the connecting mechanism 82 may also comprise an elastic collar 827, located on the connecting shaft 823 and affixed on one side of the supporting shaft sleeve 825 close to the steering engine adapter 821 to achieve positioning of the connecting shaft 823 in the axial direction.

According to the embodiment of the present invention, a turnover plate 84 is also provided under the adapting shaft 824, which may be in a rectangular or semi-circular structure, abutting under of the connecting shaft 823, and comprising: a torsional spring 841, wherein the turnover plate 84 turns over within a certain angle range. The turnover plate 84 can turn over within 90°. During manual installation of wires, the threaded pin is turned counterclockwise for more than two rounds, and then the threaded pin is retracted into the connecting shaft. At this time, the spring pull pin 8341 no longer blocks the turnover plate 84. After the manual installation of wires, the turnover plate is turned counter-clockwise by 90° by hand and the spiral pin is turned clockwise. Then the threaded pin extends out of the connecting shaft to fix the turnover plate at a position located at the moment to complete the installation of wires. Prior to automatic wire loosing, when the turnover plate 84 is in a vertical state, it is abutted and fixed by the lower end of the small-diameter portion 82413, and the rope device is abutted at the wire installation part 83. Driven by the steering engine, the connecting shaft rotates by 90°; at this time, when the small-diameter portion 82413 is driven by the connecting shaft to rotate by 90°, thereby playing no more role in abutting against the turnover plate 84, the turnover plate 84 rotates by 90° under the action of the torsional spring 841, and the rope and other components are released to achieve the automatic wire loosing. The turnover plate 84 may be a T-shaped or "⊥"-shaped piece. The wire installation part 83 comprises a U-shaped space for wire installation, which can be turned over as the snapping piece 84 is turned over. The wire installation part 83 also comprises a rotating shaft 831, about which the wire installation part 83 is turned over.

Figure 28:
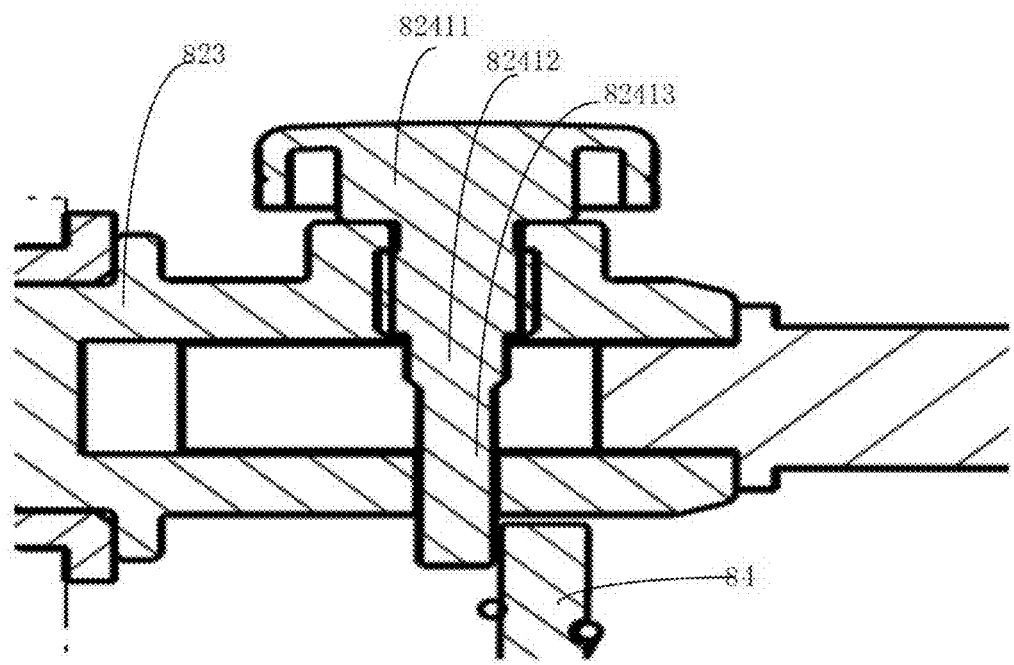
FIG. 28 is a magnified structural diagram of a threaded pin of the towing hook device according to one embodiment of the present invention.

In particular, as described in FIG. 28, the threaded pin 8241 can be manually rotated, comprising: a threaded pin handle 82411, shaped in a round handle or a pull ring for the purpose of easy pulling; and further a thicker big-diameter portion 81412, shaped in a cylinder or a prism, wherein when the threaded pin 8241 is lowered by rotation, the big-diameter portion 82412 is embedded into a corresponding notch on the pull rod of the bait device to achieve the locking of the pull rod of the bait device, that is to say, the shape of the big-diameter portion 82412 should be adaptive to the notch on the pull rod. It also comprises a thinner small-diameter portion 82413, wherein when the threaded pin 8241 is lifted, the small-diameter portion 82413 allows for the passage of the corresponding notch on the pull rod of the bait device, preferably in a shape the same as the big-diameter portion 82412; and after the threaded pin 8241 is lowered, the small-diameter portion 82413 abuts against the top end of the turnover plate 4.

A towing hook device according to the present invention has a straightforward structure, as it can provide comprehensive mounting and releasing of load pieces only by a system driven by a steering engine. By the structure design of turning a fixing device, the rotatable pin not only can control the rotation and release of the pull rod of the bait placing device, but also control the launch of ropes, thereby simplifying the structure and improving the practicability. This aquatic vehicle has a simple hook for load release, which can be added with extra loads and can perform easy release by a remote-control device when necessary.

The present invention further provides a connecting structure, comprising: a driving system 81, used for providing a driving force for rotation; a connecting shaft 823, connected to the driving system 81 and rotating according to the driving force, a connecting hole 8242, located at the end of the connecting shaft 823 and extending along the axial direction of the connecting shaft 823; a threaded pin 8241, located in the connecting shaft 823 and arranged vertical to the connecting shaft 823; and a connecting rod 85, insertable into the connecting hole 8242 for connecting a load piece. Among them, the driving system 81 comprises: a steering engine bracket 811, fixed at the tail of the main body to provide support; and a steering engine 812, fixed on the steering engine bracket 811. The steering engine 812 can provide a driving control force which can have a varying angle and can be maintained. The steering engine 812 is fixed on the steering engine bracket 811 by screws, and is fixed below the cabin cover at the tail of the main body. The whole is designed as a sealed and waterproof structure. In particular, the at least one load piece 82 comprises: a bait device or any object that can be dragged.

According to the embodiment of the present invention, the connecting mechanism 82 may comprise: a steering engine adapter 821, connecting the steering engine output shaft 822 and the connecting shaft 823 by means of snapping or cogging, or otherwise, the steering engine adapter 821 having a diameter greater than those of the steering engine output shaft 822 and the connecting shaft 823, wherein the steering engine output shaft 822 and the connecting shaft 823 can be fixed just after inserted into the steering engine adapter 821; the steering engine output shaft 822 directly transfers the rotation driving force of the steering engine 812, and the connecting shaft 823 is mainly used for adapting and connecting a connecting piece of an external load. Meanwhile, it may comprise an adapting shaft 824 fixed on the connecting shaft 823, the adapting shaft 824 laterally arranged on the connecting shaft 823, wherein the adapting shaft can be integrally formed with the connecting shaft 823, or fixed on the connecting shaft 823 by welding or snapping, as shown in FIG. 24 or 25. The steering engine adapter 821, the steering engine output shaft 822 and the connecting shaft 823 are designed waterproof through a combination of grease, supporting shaft sleeves and O-rings.

Preferably, the connecting mechanism 82 further comprises: at least one supporting shaft sleeve 825, providing a radial support for the rotation of the connecting shaft 823. In particular, it comprises two supporting shaft sleeves 825, symmetrically arranged on the connecting shaft 823, and a sealing ring 826, arranged between the two supporting shaft sleeves 825, and working with grease to form dynamic seal in a low rotation speed state. In addition, the connecting mechanism 82 may also comprise an elastic collar 827, located on the connecting shaft 823 and affixed on one side of the supporting shaft sleeve 825 close to the steering engine adapter 821 to achieve positioning of the connecting shaft 823 in the axial direction.

In particular, as described in FIG. 28, the threaded pin 8241 can be manually rotated, comprising: a threaded pin handle 82411, shaped in a round handle or a pull ring for the purpose of easy pulling; and further a thicker big-diameter portion 81412, shaped in a cylinder or a prism, wherein when the threaded pin 8241 is lowered by rotation, the big-diameter portion 82412 is embedded into a corresponding notch on the pull rod of the bait device to achieve the locking of the pull rod of the bait device, that is to say, the shape of the big-diameter portion 82412 should be adaptive to the notch on the pull rod. It also comprises a thinner small-diameter portion 82413, wherein when the threaded pin 8241 is lifted, the small-diameter portion 82413 allows for the passage of the corresponding notch on the pull rod of the bait device, preferably in a shape the same as the big-diameter portion 82412; and after the threaded pin 8241 is lowered, the small-diameter portion 82413 abuts against the top end of the turnover plate 4.

Figure 29:
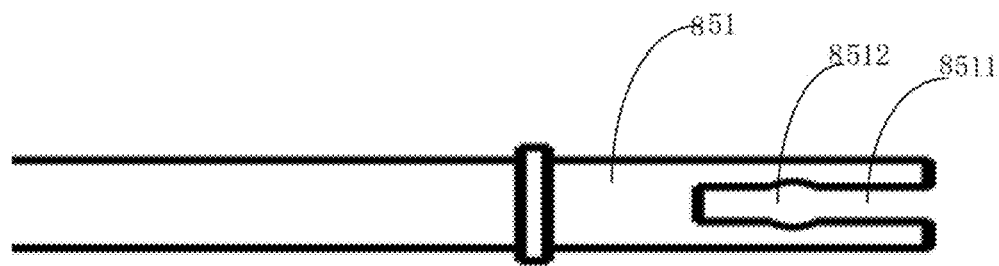
FIG. 29 is a structural diagram of a first end of the pull rod according to one embodiment of the present invention.
Figure 30:
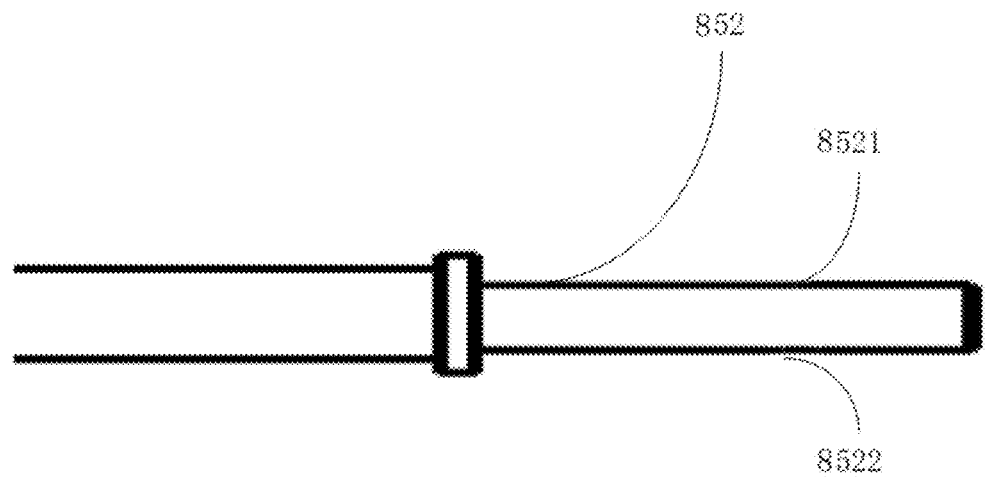
FIG. 30 is a structural diagram of a second end of the pull rod according to one embodiment of the present invention.

As shown in FIGS. 29-30, the connecting rod 85 further comprises a first end 851 inserted into the connecting hole 8242, the first end 851 comprising: a first notch 8511, corresponding to the threaded pin small-diameter portion 82413 and allowing for the smooth passage of the threaded pin small-diameter portion 82413; a second notch 8512, sunk inward along both sides of the first notch 8511 and corresponding to the threaded pin big-diameter portion 82412, wherein the threaded pin big-diameter portion 82412 is embedded thereinto, such that the connecting rod 85 can be locked. Further, the connecting rod 85 also comprises a second end 852 connecting to a load piece, the second end 852 comprising: an upper profile surface 8521 and a lower profile surface 8522, wherein the upper profile surface 8521 and the lower profile surface 8522 are different in dimension, and matched with the profile surfaces in the connecting hole 8242 to transfer torque.

According to the embodiment of the present invention as shown in FIGS. 29-30, it further comprises a bait device connection rod 85, comprising a first end 851, inserted into the connecting hole 8242; and a second end 852, connected with the bait device body. Among them, the first end 851 comprises: a first notch 8511, corresponding to the pull pin small-diameter portion 82413, wherein when the pull rod is installed, the threaded pin 8241 is lifted, and then the small-diameter portion 82413 is exactly aligned with the first notch 8511, thereby allowing for the smooth passage of the small-diameter portion 82413. Because the first notch 8511 is sunk inward for a certain distance longitudinally along the first end, the pull rod can be longitudinally inserted into the connecting shaft 823. The first end of the pull rod also comprises a second notch 8512, laterally sunk inward along both sides of the first notch 8511 and having a bore diameter slightly greater than the first notch and corresponding to the big-diameter portion 82412. When the pull rod exits and enters into a suitable position of the connecting shaft 823, the threaded pin 8241 is put down, and then the big-diameter portion 82412 is embedded into the position of the second notch, such that the bait device pull rod 85 can be locked. By this, the bait device pull rod has been installed.

As shown in FIG. 29, additionally, the second end 852 comprises an upper profile surface 8521 and a lower profile surface 8522, wherein the upper profile surface 8521 and the lower profile surface 8522 can be arranged symmetrically or asymmetrically, and can be planar or in other shapes. The upper profile surface 8521 and the lower profile surface 8522 are different in dimension, matched with the profile surfaces in the connecting shaft hole 861 of the bait device 86 to transfer torque. After inserted into the connecting shaft hole 861 of the bait device, the connecting rod 85 is stably connected with the housing 86 of the bait device. When the driving mechanism is twisted, the rotating shaft drives the connecting rod 85 to rotate, and then drives the housing 86 to tilt. At this time, the cover 863 of the bait device is separated from the bottom shell 862 by gravity, and a bait therein is released from the opening to water. When the driving mechanism is reversely twisted, the cover 863 is buckled with the bottom shell 862 under the action, returning to a closed state, and release of the bait is completed, as shown in FIG. 32.

A towing hook device according to the present invention has a straightforward structure. By the ingenious structure design of the connecting rod of the bait device, the problem that mistakes are inclined to occur in the installation process can be avoided. By the structure design of turning a fixing device, the rotatory pin not only can control the rotation and release of the pull rod of the bait placing device, but also control the launch of ropes, thereby simplifying the structure and improving the practicability. This aquatic vehicle has a simple hook for load release, which can be added with extra loads and can perform easy release by a remote-control device when necessary.

Figure 31:
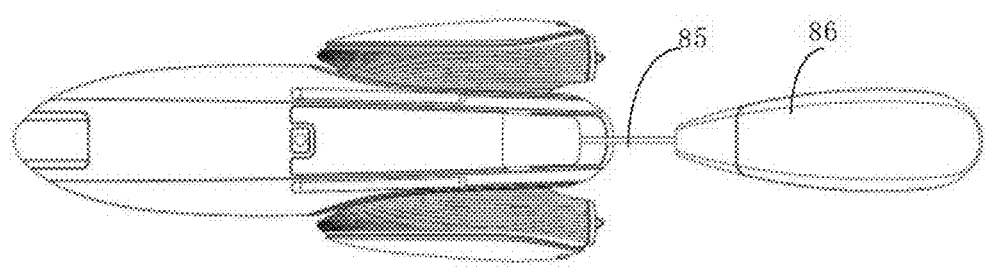
FIG. 31 is a structural diagram of an aquatic vehicle according to one embodiment of the present invention.
Figure 32:
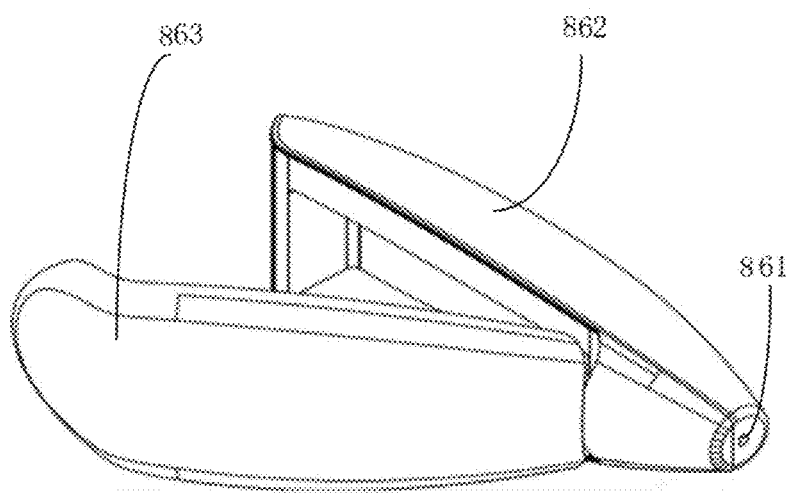
FIG. 32 is a structural diagram of a bait device of the aquatic vehicle according to one embodiment of the present invention.

As shown in FIGS. 31-32, this embodiment provides an aquatic vehicle, specifically comprising: a main body, a propeller system, a battery system, a GPS positioning module, a control system and any one of the towing hook devices as described above. Among them, no more description of the structure of the towing hook device is made below.

In this embodiment, the towing hook device is arranged at the tail of the main body to drag a load, which can be used to drag and hang fish wire and hook, rescue materials, etc. After a user delivers the materials to a designated position, the towing hook device will be released and the transported materials will automatically fall off from the main body. No particular limitation is made of the number of the towing hook devices, and 1 to 3 of the same can be arranged according to the specific structure of the aquatic vehicle, or suitably, in a number sufficient to drag the load. The towing hook device is usually arranged on the main body by welding or integral-forming process, preferably arranged on the inner side of the tail of the main body in a more concealed manner.

The propeller system comprises a propeller motor, a driving shaft and a screw propeller. The motor of the propeller can be controlled to perform forward or reverse rotation independently to drive the screw propeller to rotate by the driving shaft to complete advance, retreat, turning and other movements of the aquatic vehicle. The screw propeller part may comprise a grid structure to prevent sundries such as aquatic plants from entering and causing damage to the propulsion system.

The battery system provides power supply for the entire aquatic vehicle, and is a core part of the entire aquatic vehicle. Because the aquatic vehicle is an underwater device, it is necessary to perform sealing and waterproof design for every part of the aquatic vehicle to prevent leakage and short circuit. The battery system can adopt a structure of multiple electric cells in series or parallel connection. Among them, the charging circuit is preferably designed as Quick Charge and simultaneously provided with an anti-overcharge protection circuit. The battery system is designed as a quick-release snap structure to make it convenient to charge the battery. Certainly, the battery can also be designed as a structure integrated with the aquatic vehicle, and this will further improve the waterproof performance. The battery system transmits the voltage transformed by a transformer to the rotating motor, the propeller motor, the illumination unit and other parts.

The aquatic vehicle further comprises a central control system receiving a control signal sent by an external remote-control device. The external control can send a control command by the cell phone APP or a hand gesture, and then the control signal is received by a wireless receiving system of the aquatic vehicle, further feeding back the control information to a part that is required to be actuated.

A towing hook device according to the present invention has a straightforward structure, as it can provide comprehensive mounting and releasing of load pieces only by a system driven by a steering engine. By the ingenious structure design of the connecting rod of the bait placing device, the problem that mistakes are inclined to occur in the installation process can be avoided. By the structure design of turning a fixing device, the rotatory pin not only can control the rotation and release of the pull rod of the bait device, but also control the launch of ropes, thereby simplifying the structure and improving the practicability. This aquatic vehicle has a simple hook for load release, which can be added with extra loads and can perform easy release by a remote-control device when necessary. The connecting mechanism in the bait placing device of the aquatic vehicle according to the present invention is simple and easy to operate, and can facilitate release of a bait to a designated position.

In summary, a multi-functional aquatic vehicle and a system thereof according to the present invention include highly integrated camera, bait device, fish detector, towing hook device and other devices, and are equipped with a corresponding controlling & operating system and intelligent hardware connection to improve the intelligent multi-functional application of the aquatic vehicle. Use of a long-distance communication module, a camera with multiple degrees of freedom, a wireless remote control and an intelligent fish detector can meet a variety of existing needs underwater, and can transmit an underwater image or video in real time. By a visualization system on shore can the visual control and display be carried out to make it more convenient to obtain the rich topographical information underwater. The whole system is straightforward, convenient to apply, and has complete functions and a great prospect for intelligent application. The foregoing and other technical contents, features and effects in association with the present invention will be clearly presented in the following detailed description of the embodiments with reference to the drawings.

The device embodiments described above are exemplary only, and the units thereof described as separate components may or may not be physically separated, and the components shown as units may or may not be physical units, i.e., may be located in one place, or may be distributed to multiple network units. Some or all of the modules thereof can be selected according to actual needs so as to satisfy the purpose of the solutions in the examples.

Last but not least, it should be noted that the above examples are intended to illustrate the technical solutions of the present invention only, instead of imposing any limitation of them; although the present invention has been described in detail with reference to the above examples, those skilled in the art should understand that they still may carry out modification to the technical solution recorded in each of the above examples, or make equivalent replacement of some of the technical features therein; and such modification or replacement does not make the essence of the respective technical solutions depart from the spirit and scope of the technical solution of each of the examples of the present invention.

We claim:

1. A multi-functional aquatic vehicle, comprising a main body, wherein the main body comprises:
    a propulsion system, comprising at least one propeller for changing a motion attitude of the main body;
    a camera system, comprising at least one camera;
    a communication system, comprising a signal receiving module for receiving an external signal detected by the aquatic vehicle and a signal transmitting module for transmitting a signal to an external control system; and
    a control system, for controlling an operating state of the propulsion system, adjusting a capturing angle of the camera system and controlling internal and external communication of the communication system,
    wherein the aquatic vehicle further comprises at least one mounted device, the at least one mounted device being:
    a towing hook device, arranged at a tail of the main body and used for dragging a load; and/or
    a bait device, mounted on the main body and used for delivering materials; and/or
    a fish detector, mounted on the main body and in wire or wireless communication with the main body through the communication system;
    wherein the camera system further comprises:
    a first connecting rod;
    a second connecting rod, connected with the first connecting rod through a first rotating shaft; and
    a second rotating shaft, connecting the camera and the second connecting rod.

2. The multi-functional aquatic vehicle according to claim 1, wherein the propulsion system further comprises a steering rudder, wherein the motion attitude of the main body may be changed by the propeller and/or the steering rudder.

3. The multi-functional aquatic vehicle according to claim 1, wherein the camera system is a camera system with a switchable angle of view, capable of switching a capturing angle and capturing a target at different angles of view.

4. The multi-functional aquatic vehicle according to claim 1, wherein both the first rotating shaft and the second rotating shaft can be driven electrically or manually.

5. The multi-functional aquatic vehicle according to claim 1, wherein the bait device comprises:
    a cavity, for holding the materials; and a rotating mechanism, in fixed connection with the cavity, wherein the rotating mechanism may rotate to drive the cavity to turn over to release the materials.

6. The multi-functional aquatic vehicle according to claim 1, wherein the fish detector is screwed under the main body and comprises a sonar device, for detecting underwater targets.

7. A multi-functional aquatic vehicle system, comprising: an aquatic vehicle, comprising a main body, wherein the main body comprises:
   a propulsion system, comprising at least one propeller for changing a motion attitude of the main body;
   a camera system, comprising at least one camera;
   a communication system, comprising a signal receiving module for receiving an external signal detected by the aquatic vehicle and a signal transmitting module for transmitting a signal to an external control system; and
   a control system, for controlling an operating state of the propulsion system, adjusting a capturing angle of the camera system and controlling internal and external communication of the communication system,
   wherein the aquatic vehicle further comprises at least one mounted device, the at least one mounted device being:
   a towing hook device, arranged at a tail of the main body and used for dragging a load; and/or
   a bait device, mounted on the main body and used for delivering materials; and/or
   a fish detector, mounted on the main body and in wire or wireless communication with the main body through the communication system, and
   a remote control, achieving wire or wireless control to the aquatic vehicle, and/or
   a terminal electronic device, wherein monitoring of a state, control, track setting, and video or picture browsing of the aquatic vehicle are achieved through the visual control interface;
   wherein the camera system further comprises:
   a first connecting rod;
   a second connecting rod, connected with the first connecting rod through a first rotating shaft; and
   a second rotating shaft, connecting the camera and the second connecting rod.

8. The multi-functional aquatic vehicle system according to claim 7, wherein the bait device comprises:
   a cavity, for holding the materials; and
   a rotating mechanism, in fixed connection with the cavity, wherein the rotating mechanism may rotate to drive the cavity to turn over to release the materials.

9. The multi-functional aquatic vehicle according to claim 1, wherein the towing hook device further comprises:
   a driving system, for providing a driving force for rotation;
   a connecting mechanism, for connecting the driving system and rotating according to the driving force; and
   a towing hook mechanism, for hooking a carrier;
   wherein the driving system drives the connecting mechanism to rotate such that the towing hook mechanism turns over or rotates to release the carrier.

10. The multi-functional aquatic vehicle according to claim 9, wherein the driving system comprises: a steering engine bracket, fixed at a tail of a hull to provide support; and a steering engine, fixed on the steering engine bracket; the connecting mechanism comprises: a steering engine adapter, connecting an output shaft of the steering engine and a connecting shaft; and an adapting shaft, fixed on the connecting shaft.

11. The multi-functional aquatic vehicle according to claim 9, wherein the towing hook device comprises a snapping part, located below the connecting mechanism and used for snapping the carrier, wherein the driving system drives the connecting mechanism to rotate and enables the snapping part to turn over to release the carrier.

12. The multi-functional aquatic vehicle according to claim 11, wherein the snapping part comprises a torsional spring, the snapping part may turn over within a certain angle range under the action of the torsional spring; and the adapting shaft comprises a built-in spring pull pin, abutting at the lower end thereof against the top end of the snapping part for limiting a position of the snapping part at the time of snapping the carrier.

13. The multi-functional aquatic vehicle according to claim 12, wherein a process that the towing hook device releases the carrier comprises: the driving system drives the connecting mechanism to rotate, and the spring pull pin disengages from a limiting position with regard to the snapping part as the connecting mechanism rotates, such that the snapping part turns over under the action of the torsional spring to release the carrier.

14. The multi-functional aquatic vehicle according to claim 9, wherein the towing hook device comprises a wire installation part, for installing a connecting wire connecting to the carrier, the wire installation part comprising a snapping piece located below the connecting mechanism; wherein the driving system drives the connecting mechanism to rotate such that the snapping piece turns over and drives the wire installation part to rotate to release the carrier.

15. The towing hook device according to claim 14, wherein the connecting mechanism further comprises: at least one supporting shaft sleeve, providing a radial support for rotation of the connecting shaft; and the adapting shaft comprises a built-in spring pull pin.

16. The multi-functional aquatic vehicle according to claim 15, wherein the connecting mechanism comprises:
   an elastic collar, located on the connecting shaft and on one side of the supporting shaft sleeve close to the steering engine adapter to achieve positioning of the connecting shaft in an axial direction.

17. The multi-functional aquatic vehicle according to claim 16, wherein the snapping piece comprises a torsional spring, wherein the snapping piece turns over within a certain angle range under the action of the torsional spring; and the wire installation part comprises a U-shaped wire installation space, capable of turning over as the snapping piece turns over, and further comprises a rotating shaft, about which the wire installation part turns over.

18. The multi-functional aquatic vehicle according to claim 14, wherein a process that the towing hook device releases the carrier comprises: the driving system drives the connecting mechanism to rotate, and the threaded pin disengages from a limiting position with regard to the snapping piece as the connecting mechanism rotates, such that the snapping piece turns over under the action of the torsional spring to release the carrier.

19. The multi-functional aquatic vehicle according to claim 9, wherein the carrier is selected from at least one of the following: fishing line, rescue equipment, fishing hook, rope, buoy and locator beacon.

* * * * *